US011280663B2

(12) United States Patent
Norman

(10) Patent No.: US 11,280,663 B2
(45) Date of Patent: Mar. 22, 2022

(54) WEIGHING SYSTEM AND WEIGHING METHOD

(71) Applicant: Olympus Automation Limited, Peterborough (GB)

(72) Inventor: Harry Norman, Oundle (GB)

(73) Assignee: Olympus Automation Limited

( * ) Notice: Subject to any disclaimer, the term of this patent is extended or adjusted under 35 U.S.C. 154(b) by 0 days.

(21) Appl. No.: 16/296,330

(22) Filed: Mar. 8, 2019

(65) Prior Publication Data
US 2020/0209047 A1    Jul. 2, 2020

(30) Foreign Application Priority Data

Mar. 8, 2018  (GB) .................................. 1803741.6

(51) Int. Cl.
| | |
|---|---|
| *G01G 13/16* | (2006.01) |
| *B01F 15/02* | (2006.01) |
| *B65B 1/32* | (2006.01) |
| *B65B 37/18* | (2006.01) |

(52) U.S. Cl.
CPC ......... *G01G 13/16* (2013.01); *B01F 15/0253* (2013.01); *B65B 1/32* (2013.01); *B65B 37/18* (2013.01)

(58) Field of Classification Search
CPC .............. G01G 13/02; B65B 1/32; B65B 1/34
USPC ........................................................ 222/161
See application file for complete search history.

(56) References Cited

U.S. PATENT DOCUMENTS

| | | | | |
|---|---|---|---|---|
| 3,865,278 | A * | 2/1975 | Gallati .................... | G01G 13/08 222/161 |
| 5,363,885 | A * | 11/1994 | McConnell .............. | G01N 1/28 141/1 |
| 7,712,634 | B2 * | 5/2010 | MacMichael ............. | B65B 1/08 222/198 |
| 8,104,521 | B2 * | 1/2012 | Luchinger ............. | G01F 13/001 141/83 |
| 8,271,138 | B2 * | 9/2012 | Eliuk ........................ | B66C 1/42 700/260 |
| 8,776,840 | B2 * | 7/2014 | Meckstroth ............. | B65B 37/04 141/72 |

(Continued)

FOREIGN PATENT DOCUMENTS

| | | |
|---|---|---|
| DE | 19907619 A1 | 2/2000 |
| JP | H03202720 A | 9/1991 |
| WO | 2012077343 A1 | 6/2012 |

*Primary Examiner* — Timothy L Maust
(74) *Attorney, Agent, or Firm* — Endurance Law Group PLC

(57) ABSTRACT

A weighing system for weighing particulate material such as powders, granules and the like, and particularly particulate foodstuffs. The system includes: a weighing device (9); a vibrator unit (11); a transfer receptacle (7) having an opening; a robotic arm (5) arranged to move the transfer receptacle (7); and a control system (13) arranged to control the robotic arm (5) and the vibrator unit (11); wherein the transfer receptacle (7) is arranged to receive a quantity of the particulate material through the opening; the control system (13) is arranged to actuate the robotic arm (5) to move the transfer receptacle adjacent the weighing device (9), and to actuate the vibrator unit (11) to vibrate the transfer receptacle (7) thereby causing particulate material located in the transfer receptacle (7) to dispense from the transfer receptacle onto the weighing device (9).

31 Claims, 13 Drawing Sheets

(56) References Cited

U.S. PATENT DOCUMENTS

| | | | |
|---|---|---|---|
| 8,803,009 B2* | 8/2014 | Poole | G01G 13/24 |
| | | | 177/1 |
| 10,569,419 B2* | 2/2020 | Yamaguchi | B25J 9/1697 |
| 2005/0133729 A1* | 6/2005 | Woodworth | A61L 2/087 |
| | | | 250/455.11 |
| 2005/0267628 A1* | 12/2005 | Crowder | A61M 15/0005 |
| | | | 700/240 |
| 2008/0017669 A1* | 1/2008 | MacMichael | B65B 1/08 |
| | | | 222/161 |
| 2009/0014086 A1* | 1/2009 | MacMichael | B65B 1/08 |
| | | | 141/12 |
| 2010/0147880 A1* | 6/2010 | Kreutzer | C04B 14/30 |
| | | | 222/55 |
| 2014/0048172 A1 | 2/2014 | Tomioka et al. | |
| 2016/0136052 A1* | 5/2016 | Koike | G05D 9/00 |
| | | | 141/94 |
| 2018/0155068 A1* | 6/2018 | Bailey | B65B 1/32 |

* cited by examiner

FIG. 5a
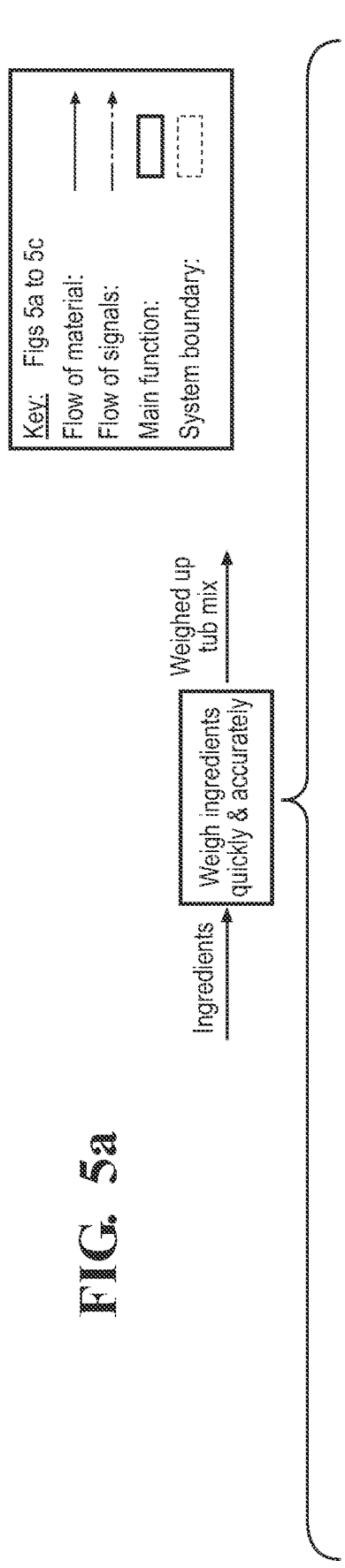
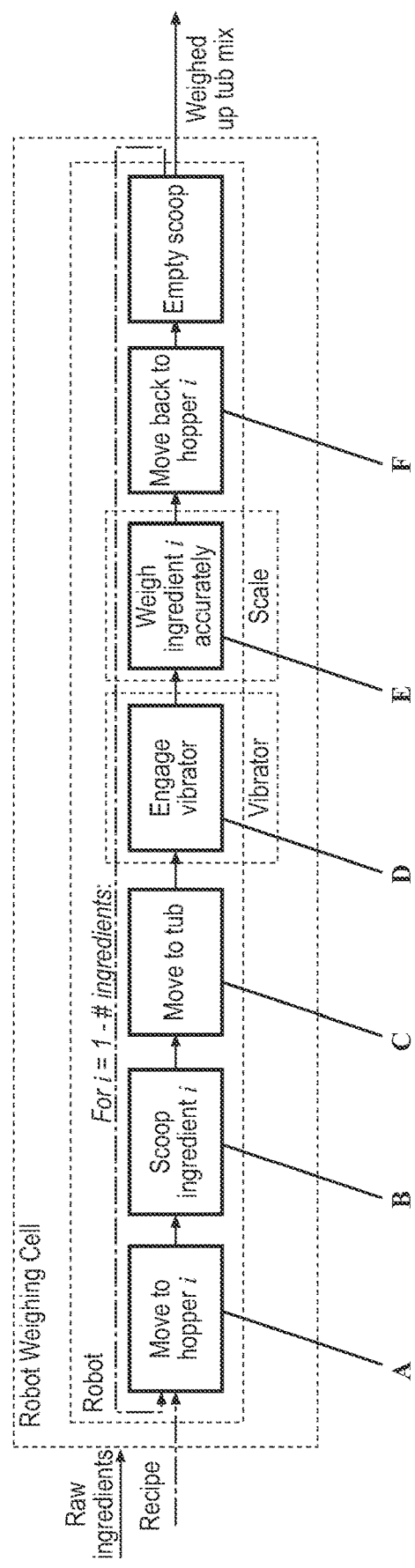
Fig. 1. Simplified function structure showing the relationships between the APRIL weighing system inputs and outputs.

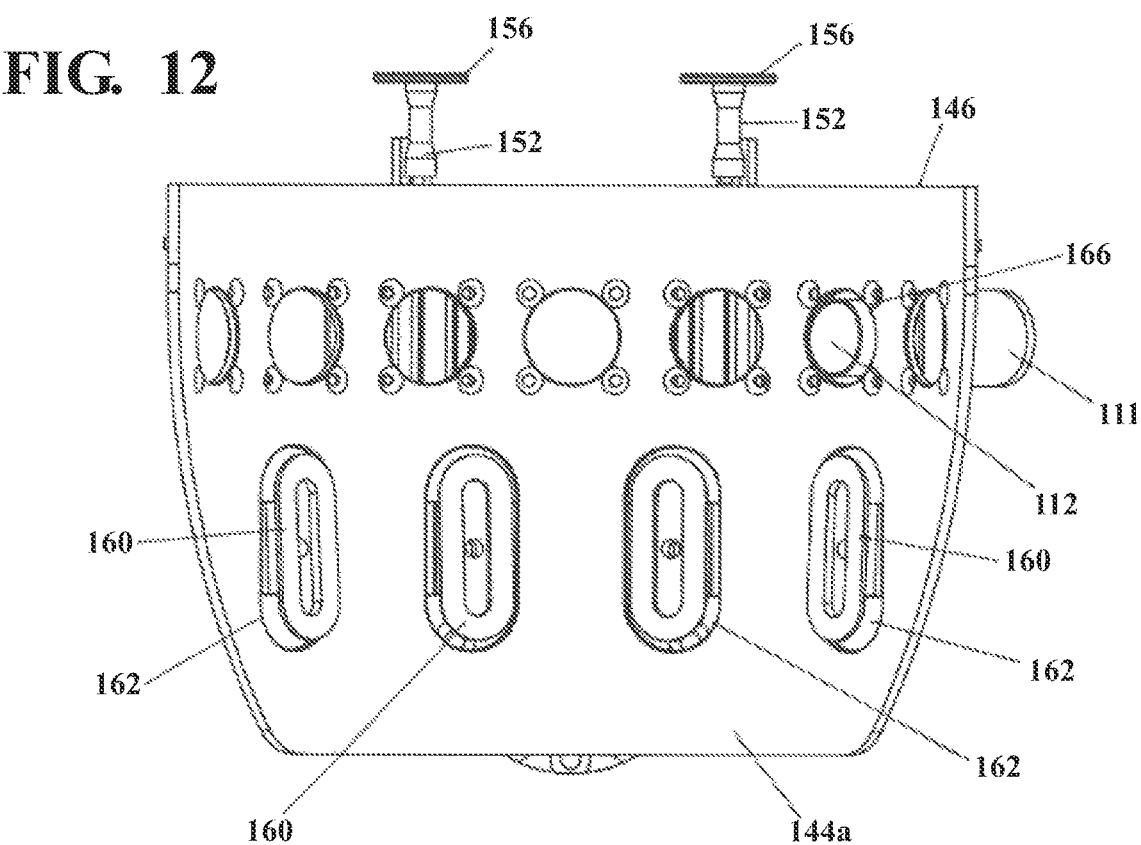
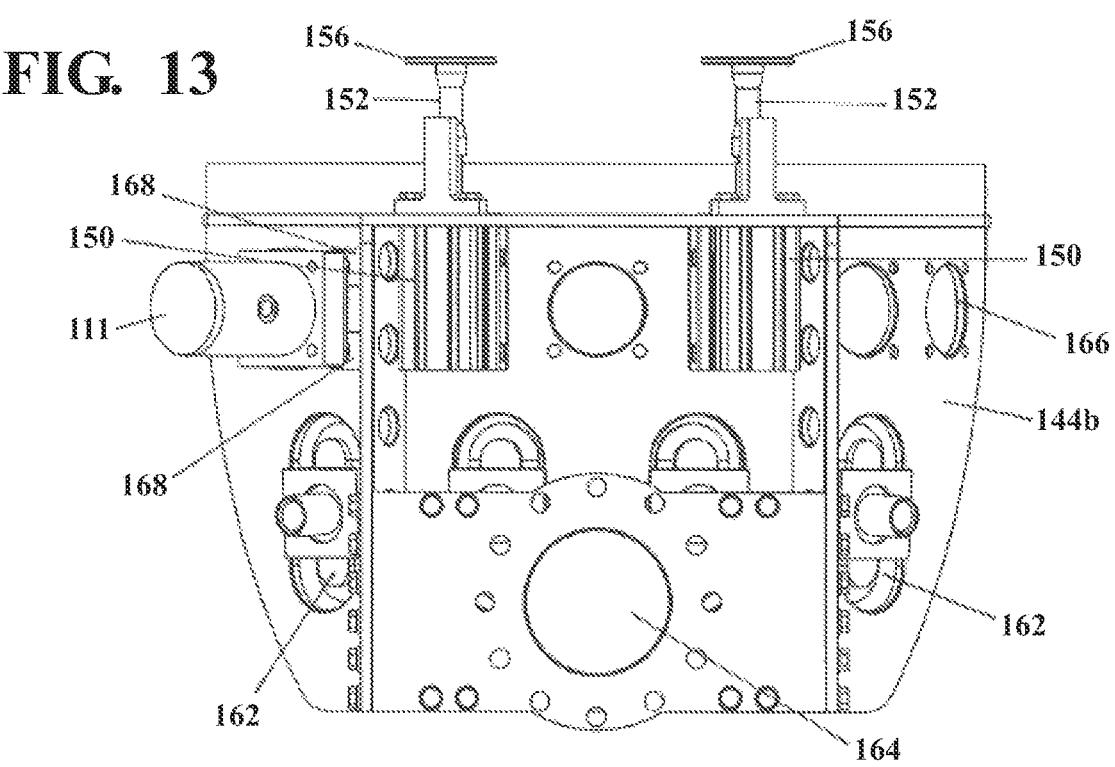

WEIGHING SYSTEM AND WEIGHING METHOD

FIELD OF INVENTION

The present invention relates to a weighing system and weighing method for measuring the weight of particulate materials, and is particularly suited to weighing particulate foodstuffs.

BACKGROUND ART

In the food processing industry it is often necessary to weigh foodstuffs to ensure that the correct quantity of foodstuff is dispensed into a package. Typically the foodstuff arrives at a food processing plant in bulk supply and is subsequently split into smaller quantities, which can be distributed to shops for sale. For example, flour may arrive at the plant in 25 kg packages. These large packages are opened by process workers and split into smaller packages, such as 25×1 kg packages, using weighing scales. The process is undertaken manually and is therefore labour intensive. Labour intensive processes can be very costly, manual weighing is susceptible to human error, and there are health and safety issues related to the manipulation of large packages, which can lead to absence of workers, higher staff turnover and loss of production.

Accordingly there is a desire to automate at least part of the weighing process to mitigate at least one of the problems outlined above. Furthermore an automated process needs to balance the requirements of a high throughput with an acceptable level of accuracy.

SUMMARY OF THE INVENTION

It is an objective of the present invention to provide a weighing system that automatically separates a large quantity of a foodstuff into multiple smaller quantities, each smaller quantity having a target weight. It is further objective of the present invention to provide an automated weighing system that balances throughput (the number of smaller quantities weighed per unit of time) and weighing accuracy.

According to one aspect of the invention there is provided a weighing system for weighing particulate materials such as powders, granules and the like, and preferably particulate foodstuffs, according to claim 1. The invention provides an excellent balance for weighing particulate materials accurately, while at the same time achieving a relatively high throughput of material.

According to another aspect of the invention there is provided a weighing system for weighing particulate materials such as powders, granules and the like, and preferably particulate foodstuffs.

The system can include a weighing device.

The system can include a vibrator unit.

The system can include a transfer receptacle having an opening.

The system can include a robotic arm. The robotic arm can be arranged to move the transfer receptacle.

The system can include a control system. The control system can be arranged to control the robotic arm. The control system can be arranged to control the vibrator unit.

The transfer receptacle can be arranged to receive a quantity of the particulate material through the opening.

The control system can be arranged to actuate the robotic arm to move the transfer receptacle adjacent the weighing device. The control system can be arranged to actuate the vibrator unit to vibrate the transfer receptacle thereby causing particulate material located in the transfer receptacle to dispense from the transfer receptacle onto the weighing device.

Typically a container is located on the weighing device and the material is dispensed into the container.

The control system can be arranged to monitor an output signal from the weighing device during a weighing operation, which is indicative of a measured weight of particulate material dispensed onto the weighing device, in order to achieve a target weight of dispensed particulate material.

The control system can be arranged to adjust the vibrator unit vibration frequency during a weighing operation in order to control the rate at which particulate material is dispensed from the transfer receptacle. The control system can be arranged to adjust the vibrator unit vibration frequency in response to signals received from the weighing device.

The control system can be arranged to adjust the vibrator unit vibration amplitude during a weighing operation in order to control the rate at which particulate material is dispensed from the transfer receptacle. The control system can be arranged to adjust the vibrator unit vibration amplitude in response to signals received from the weighing device.

The control system can be arranged to determine a condition wherein the measured weight can be equal to a first predetermined fraction of the target weight, and in response to detecting the condition, the control system can be arranged to switch the vibrator unit from a first operational condition which causes particulate material to dispense from the transfer receptacle at a first flow rate to a second operational condition which causes particulate material to dispense from the transfer receptacle at a second flow rate. The first predetermined fraction of the target weight can be typically within the range 90% to 98% of the target weight. The first operational condition has a first amplitude of vibration and the second operational condition has a second amplitude of vibration, the second amplitude of vibration can be different from the first amplitude of vibration. The first operational condition has a first frequency of vibration and the second operational condition has a second frequency of vibration, wherein the second frequency of vibration can be different from the first frequency of vibration.

The second amplitude of vibration can be lower than the first amplitude of vibration. The second frequency of vibration can be lower than the first frequency of vibration. The second flow rate can be lower than the first flow rate. The inventors have determined that accurate weighing can be achieved with this arrangement. Typically the final measured weight can be accurate to within 1% of the target weight. For example, the second flow rate can be approximately 10 to 30% of the first flow rate.

The control system can be arranged to adjust an angle of inclination of the transfer receptacle to a dispensing angle of inclination to commence dispensing of the particulate material from the transfer receptacle. The angle of inclination is an angle subtended between a central longitudinal axis of the transfer receptacle and a vertical axis.

The control system can be arranged to adjust the angle of inclination of the transfer receptacle during a weighing operation in order to control the rate at which particulate material is dispensed from the transfer receptacle.

The control system can be arranged to determine a condition wherein the measured weight can be equal to a first predetermined fraction of the target weight, and in response to detecting the condition, the control system can be arranged to adjust the angle of inclination of the transfer receptacle from a first inclination angle which causes particulate material to dispense from the receptacle at a first flow rate to a second inclination angle which causes particulate material to dispense from the transfer receptacle at a second flow rate. Typically the second angle of inclination can be less than the first angle of inclination. In other words, the second angle of inclination causes the transfer receptacle to be more upright than the first angle of inclination.

The control system can be arranged to cease vibrating the transfer receptacle when the control system determines from the output signal that the measured weight is equal to the target weight, within an acceptable measuring tolerance. The control system can cease vibrating the transfer receptacle by switching off the vibrator unit and/or moving the transfer receptacle out of engagement with the vibrator unit.

The control system can be arranged to change the angle of inclination of the transfer receptacle to a non-dispensing angle of inclination when the control system determines from the output signal that the measured weight is equal to the target weight, within an acceptable measuring tolerance.

In some embodiments the vibrator unit has an operational vibration frequency that can be greater than or equal to 1 Hz. In some embodiments the vibrator unit has an operational vibration frequency that can be less than or equal to 300 Hz. In some embodiments the vibration frequency can be in the range 1 Hz to 100 Hz.

In some embodiments the vibrator unit has an operating vibration amplitude that can be greater than or equal to 0.1 mm. In some embodiments the vibrator unit has an operating vibration amplitude that can be less than or equal to 10 mm. This is the extent to which it moves towards and away from the transfer receptacle.

The vibrator unit can be arranged to cause particulate material to be dispensed from the transfer receptacle via the transfer receptacle opening.

The robotic arm can include an end effector. The end effector can be arranged to engage the transfer receptacle.

The end effector can be arranged to engage a side wall of the transfer receptacle. The end effector can be arranged to engage a rim of the transfer receptacle. The rim can be located at the opening of the transfer receptacle. The opening can be located at an upper end of the transfer receptacle.

The end effector can include an engagement plate. The engagement plate can be arranged to engage the side wall of the transfer receptacle. The engagement plate can be arranged to engage the rim of the transfer receptacle. An upper face of the engagement plate can be arranged to engage the transfer receptacle rim. Typically the upper face of the engagement plate engages an underside of the rim. Typically a major surface, such as a front surface, of the engagement plate can be arranged to engage the side wall of the transfer receptacle.

The end effector can include a locking system that is arranged to clamp the transfer receptacle to the end effector.

The locking system can be arranged to clamp a rim of the transfer receptacle to the end effector. For example, the locking system can be arranged to clamp the rim of the transfer receptacle to the engagement plate.

The locking system can include at least one linear actuator arranged to clamp the rim of the transfer receptacle to the engagement plate. The at least one linear actuator can include a rod and a clamping member attached to the rod. The control system can be arranged to control operation of the locking system. In particular, the control system can be arranged to control operation of the at least one linear actuator. Typically the locking system includes a plurality of linear actuators. The locking system can include limit switches. The control system is able to determine from the limit switches when the linear actuators are in their locking and/or non-locking positions.

The vibrator unit can be mounted on the robotic arm.

The vibrator unit can be mounted on the end effector. The vibrator unit can be an impact unit or an oscillating unit. The vibrator unit can include a piston having an engagement head. The piston can be arranged to move along a path in a reciprocating fashion, thereby impacting the side wall of the transfer receptacle. The path can be a linear path.

The system can include damping material arranged to damp vibration energy generated by the vibrator unit. The damping material is arranged to reduce the vibrational energy that is transmitted to the robotic arm. The damping material can be located between the vibrator unit and the end effector. The damping material reduces the vibration energy transferred from the vibrator unit to the end effector, and hence to the robotic arm.

The end effector can include a vacuum system. The vacuum system can be arranged to apply a negative pressure to the transfer receptacle, for example adjacent to a wall of the transfer receptacle, and preferably a side wall of the transfer receptacle. The vacuum system can be arranged to suck the side wall towards the engagement plate, thereby improving the grip between the transfer receptacle and end effector.

The control system can be arranged to control operation of the vacuum system. The control system can be arranged to actuate the vacuum system when the transfer receptacle is storing a quantity of particulate material. In this instance, the transfer receptacle is heavier than in an unloaded state. The vacuum system provides additional stability and support to the transfer receptacle in the loaded condition.

The vacuum system can include at least one suction cup. The at least one suction cup can be arranged to engage the wall of the transfer receptacle, and preferably a side wall of the transfer receptacle. Typically the vacuum system includes a plurality of suction cups distributed across the engagement plate. Typically the suction cups are mounted to a face of the engagement plate that faces towards the side wall of the transfer receptacle.

The weighing system can include a include a local ventilation system having a ventilation unit cowling located adjacent the weighing device. The ventilation unit cowling can be pivotally attached to a mounting. The ventilation unit cowling can be pivoted between a first, operational, position adjacent the container during a weighing operation and a second, non-operational, position. This enables the container to be removed from the weighing device. The control system can be arranged to control operation of the ventilation system. For example, the control system can be arranged to control operation of the ventilation unit cowling to move it between the first and second positions.

The transfer receptacle can include a base. The base can be solid, this is have on perforations. The transfer receptacle can include at least one side wall. The at least one side wall can be solid, that is have no perforations. The outer surface of the side wall can be curved.

The transfer receptacle can include perforations. The vibrator unit can be arranged to cause particulate material to be dispensed from the transfer receptacle via the perforations.

The base can include an area of perforations. The at least one side wall can include an area of perforations. A multiplicity of perforations can be formed in the transfer receptacle, for example in the form of a mesh. The perforations are sized such that no (or very little) particulate material is dispensed through the perforations when transfer receptacle is in a non-vibrated state. The size of the perforations depends on the size of the particles, the type of particles and environmental factors such as temperature and humidity. For example, the perforations typically have a width in the range 0.1 mm to 5 mm.

The perforations can be distributed across substantially the entire side wall. The perforations can be distributed across at least one localised area of the at least one side wall. For example, the perforations can be located towards a lower end of the at least one side wall.

The perforations can be distributed across substantially the entire base. Surprisingly, the particles do not fall out of the transfer receptacle through the perforated base, unless the receptacle is excited by the vibrator unit. The perforations can be distributed across at least one localised area of the base. For example, the perforations can be located in a central portion of the base. The perforations can be located towards peripheral portions of the base.

The transfer receptacle can include a lifting bracket. The lifting bracket can be arranged to be gripped by an end effector of the robotic arm. The lifting bracket can protrude outwardly from an outer surface of the at least one side wall. The lifting bracket can include a U-shaped formation. The U-shaped formation promotes vibration of the transfer receptacle. The lifting bracket can include a castellated tubular formation for gripping by the robotic arm end effector. The lifting bracket can comprise a looped band. The looped band has first and second ends that are fixed to the outer surface of the at least one side wall.

The transfer receptacle can be substantially cylindrical. The transfer receptacle can have a tapered side wall.

The transfer receptacle can include metal, and preferably a food grade metal such as a food grade steel, for example stainless steel. The transfer receptacle can include plastic, such as a food grade plastic, such as PVC.

The vibrator unit can be located adjacent the weighing device. This ensures that foodstuff falls onto the weighing device, when the vibrator unit is not included in the robotic arm. In this arrangement, the robotic arm holds the transfer receptacle against the vibrator unit, or against a member excited by the vibrator unit, in order to dispense material from the transfer receptacle.

In some embodiments the robotic arm scoops particulate material into the transfer receptacle from a particulate material storage unit.

The particulate material storage unit can include a trough. The robotic arm scoops particulate material into the transfer receptacle from the trough.

The particulate material storage unit can include a hopper. The particulate material storage unit can include a downpipe. Preferably the downpipe connects the hopper to the trough and the downpipe provides a feed of particulate material from the hopper to the trough. The downpipe connects a lower end of the hopper to the proximal end of the trough. A lower end of the downpipe can include a bend. The downpipe can be attached to an end wall of the trough. The downpipe bend can be connected to the end wall. The downpipe and trough together can form a substantially J-shaped assembly. The trough can include a base. The base can slope downwards in a longitudinal direction from an end of the trough that can be proximal to the downpipe when the storage unit can be in its normal operational orientation. The slope helps to ensure that particulate material fed from the downpipe falls into a trough scoop zone under the action of gravity. For example, after particulate material has been scooped from the trough the cavity left by removing material from the trough can be quickly filled by particulate material falling downwards from the downpipe. The base can have a greatest depth in a scoop zone. The base can slope downwards from the distal end of the trough to the greatest depth. The base can slope downwards in a longitudinal direction from an end of the trough that can be distal from the downpipe. The base can slope downwards from the proximal end of the trough to the greatest depth. At least part, and preferably the entire, base can be arcuate in a longitudinal direction of the trough. The base being arcuate in the longitudinal direction can be particularly suited to feeding particulate material to the scoop zone. Preferably the base extends in the longitudinal direction through an arc of at least 70°, preferably at least 80° and more preferably still at least 90°. Preferably the base extends in the longitudinal direction through an arc less than 150°, preferably less than 140°, more preferably less than 130° and more preferably still less than 120°. This helps to ensure that the arcuate base can be accessible to the transfer receptacle. At least part, and preferably the entire, base can be arcuate in a transverse direction of the trough. The base being arcuate in the transverse direction makes the trough particularly suited to cylindrical transfer receptacles. Preferably the base extends through an arc in the range 90° to 180°. The width of the trough can substantially match the width of the transfer receptacle. This minimizes the amount of particulate material that can be forced into gaps between the outer surface of the transfer receptacle and side walls of the trough. The trough end wall can be inclined, and preferably can be arranged along a radial path with respect to the arcuate base.

The storage unit can include a closure member, such as a door, for selectively closing the trough. The closure member can be pivotally attached to at least one of the trough and the down pipe.

The storage unit can include a locking mechanism for locking the position of the closure member. Preferably the locking mechanism can be arranged to lock the closure member in an open position.

The trough can include side walls. The side walls can flare outwards from the base towards an open upper portion of the trough. The separation of the side walls at an end of the trough that can be distal from the down pipe can be narrower than the separation of the side walls at end of the trough that can be proximal to the downpipe.

According to another aspect of the invention there is provided a method for weighing particulate materials such as powders, granules and the like, and preferably particulate foodstuffs, said method including: providing a system according to any configuration described herein.

The method can include inserting a quantity of particulate material into the transfer receptacle.

The method can include moving the transfer receptacle adjacent the weighing device.

The method can include actuating the vibrator unit to vibrate the transfer receptacle thereby dispensing the particulate material from the transfer receptacle into a container located on the weighing device.

The method can include the control system, in response to signals received from the weighing device, adjusting a vibration amplitude of the vibrator unit in order to adjust the flow rate of material dispensed from the transfer receptacle.

The method can include the control system, in response to signals received from the weighing device, adjusting a vibration frequency of the vibrator unit in order to adjust the flow rate of material dispensed from the transfer receptacle.

The method can include the control system determining a condition wherein the measured weight can be equal to a first predetermined fraction of the target weight, and in response to detecting the condition, the control system switching the vibrator unit from a first operational condition which causes particulate material to dispense from the transfer receptacle at a first flow rate to a second operational condition which causes particulate material to dispense from the transfer receptacle at a second flow rate.

The method can include the control system, in response to signals received from the weighing device, adjusting an angle of inclination of the transfer receptacle in order to adjust the flow rate of material dispensed from the transfer receptacle.

The method can include the control system determining a condition has occurred wherein the measured weight can be equal to a first predetermined fraction of the target weight, and in response to detecting the condition has occurred, the control system adjusting the angle of inclination of the transfer receptacle from a first inclination angle which causes particulate material to dispense from the receptacle at a first flow rate to a second inclination angle which causes particulate material to dispense from the transfer receptacle at a second flow rate.

The method can include the robotic arm moving the transfer receptacle to a filling station.

The method can include the robotic arm scooping particulate material from a particulate material storage unit using the transfer receptacle. The method can include using the robotic arm to collect in the transfer receptacle a quantity of foodstuff from the foodstuff storage unit. The method can include using the robotic arm to move the transfer receptacle adjacent the weighing device. The method can include vibrating the transfer receptacle by means of the vibrator unit, thereby dispensing the foodstuff located in the transfer receptacle through the perforations onto the weighing device.

According to another aspect of the invention there is provided a weighing system for weighing particulate foodstuffs such as powders, granules and the like. The system can include a storage unit for storing a foodstuff. The system can include a weighing device. The system can include a vibrator unit. The system can include a transfer receptacle having an opening for receiving foodstuff and perforations formed in at least one wall of the transfer receptacle for dispensing foodstuff therefrom. The system can include a robotic arm arranged to move the transfer receptacle; and a control system arranged to control the robotic arm. The robotic arm can be arranged to collect in the transfer receptacle a quantity of foodstuff from the foodstuff storage unit and to move the transfer receptacle adjacent the weighing device. The vibrator unit can be arranged to vibrate the transfer receptacle to cause the foodstuff located in the transfer receptacle to dispense onto the weighing device through the perforations.

According to another aspect of the invention there is provided a transfer receptacle for transferring solid foodstuffs such as powder, granules and the like from a foodstuff storage unit to a weighing device, said transfer receptacle, including: a base, an open top for receiving foodstuff, and at least one side wall located between the base and the open top. At least a part of at least one of the base and the at least one side wall can include a multiplicity of perforations. The perforations provide openings through which foodstuff contained within the transfer receptacle can be dispensed when the transfer receptacle is vibrated by a vibrator unit.

The receptacle can include a lifting bracket arranged to be gripped by an end effector of a robotic arm.

The lifting bracket can protrude outwardly from an outer surface of the at least one side wall.

The lifting bracket can include a U-shaped formation for promoting vibration of the receptacle.

The lifting bracket can include a castellated tubular formation for gripping by the robotic arm end effector.

The lifting bracket can comprise a looped band. The looped band has first and second ends that are fixed to the outer surface of the at least one side wall.

The receptacle can be substantially cylindrical.

According to another aspect of the invention there is provided a storage unit for storing flowable solid foodstuffs, such as powders, granules and the like, said storage unit including: a hopper; a downpipe; and a trough. The downpipe can connect the hopper to the trough. The downpipe can provide a feed of foodstuff from the hopper to the trough. Preferably the trough includes a base, wherein the base slopes downwards, in a longitudinal direction of the trough, from an end of the trough that is proximal to the downpipe when the storage unit is in its normal operational orientation. The slope helps to ensure that foodstuff fed from the downpipe falls into a trough scoop zone under the action of gravity, particularly after foodstuff has been scooped from the trough. The downpipe feeds foodstuff to the trough. The downpipe can be arranged to feed foodstuff to the trough under the action of gravity alone.

The downpipe can connect a lower end of the hopper to the proximal end of the trough. A lower end of the downpipe can include a bend. The downpipe can be attached to an end wall of the trough.

The base can slope downwards from an end of the trough that is distal from the downpipe. The base can have a lowest point in a scoop zone. The base can slope downwards from the proximal end of the trough to the lowest point. The base can slope downwards from the distal At least part of the base, and preferably the entire base, can be arcuate in a longitudinal direction of the trough. The base being arcuate in the longitudinal direction is particularly suited to feeding foodstuff to the scoop zone. Preferably the base extends in the longitudinal direction through an arc of at least 70°, preferably at least 80° and more preferably still at least 90°. Preferably the base extends in the longitudinal direction through an arc less than 150°, preferably less than 140°, more preferably less than 130° and more preferably still less than 120°.

At least part of the base, and preferably the entire base, can be arcuate in a transverse direction of the trough. The base being arcuate in the transverse direction makes the trough particularly suited to cylindrical transfer receptacles. Preferably the base extends through an arc in the range 90° to 180°.

The storage unit can include a closure member, such as a door for selectively closing the trough. The closure member is pivotally attached to at least one of the trough and the down pipe.

The storage unit can include a locking mechanism for locking the position of the closure member. Preferably the locking mechanism is arranged to lock the closure member in an open position.

The trough can include side walls.

The side walls can flare outwards from the base towards an open upper portion of the trough.

The separation of the side walls at an end of the trough that is distal from the down pipe, can be narrower than the separation of the side walls at end of the trough that is proximal to the downpipe.

The downpipe can be attached to one end of the trough in a manner that provides a substantially J-shaped assembly.

The downpipe can be attached to an end wall of the trough. The end wall can be inclined, and preferably is arranged along a radial path, with respect to the arcuate base. The downpipe has a lower end, and the lower end can include a bend adjacent the end wall.

BRIEF DESCRIPTION OF DRAWINGS

Embodiments of the present invention will now be described, by way of example only, with reference to the accompanying drawings, in which:

FIG. 4b is side view of the foodstuff store of FIG. 4a;

FIG. 5a is a flow diagram showing weighing system inputs and outputs;

FIG. 12 is a front view of the end effector of FIG. 10;

FIG. 13 is a rear view of the end effector of FIG. 10;

DETAILED DESCRIPTION OF AN EMBODIMENT OF THE INVENTION

Figure 1:
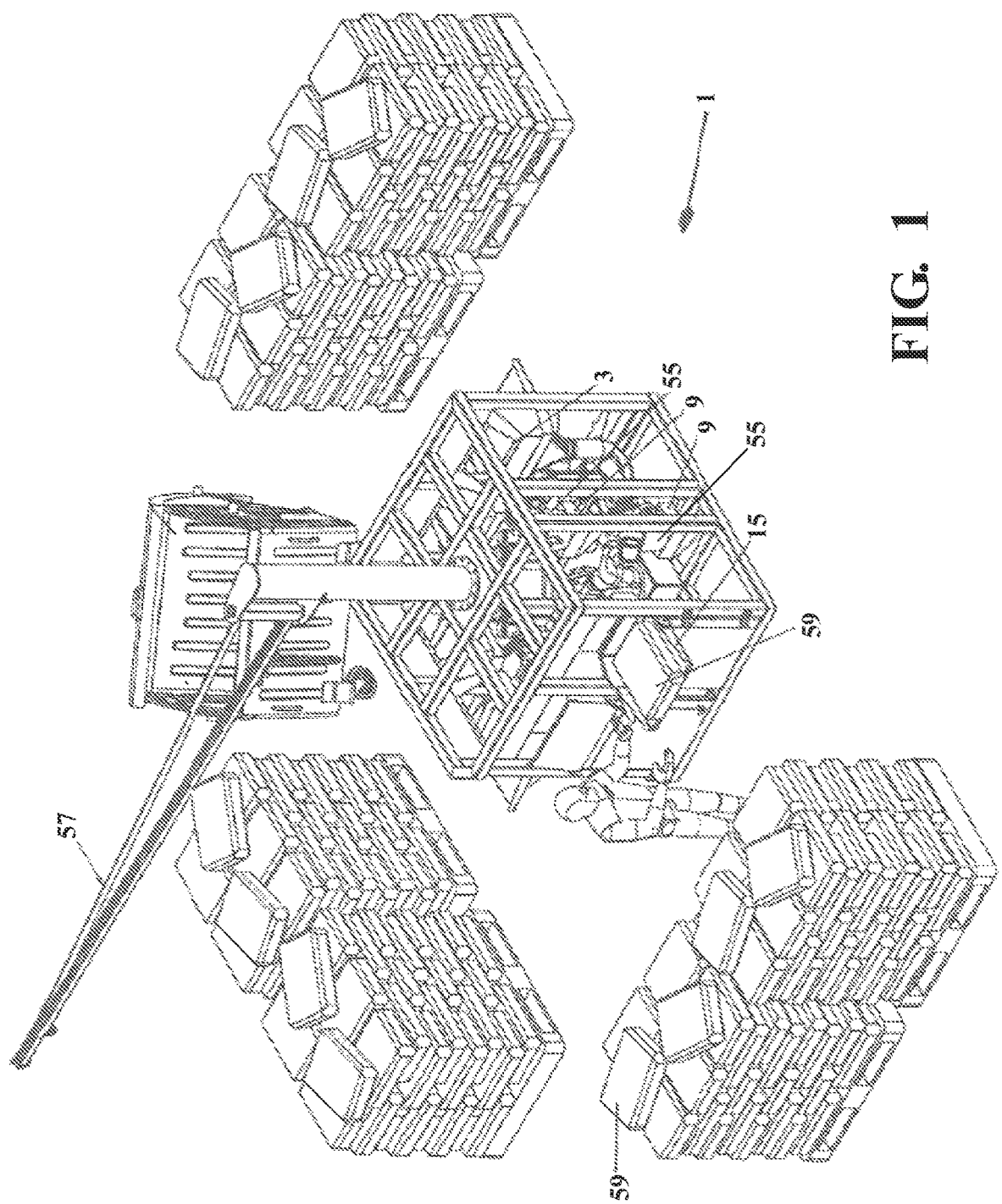
FIG. 1 is a diagrammatic view of part of an automated weighing system according to a first embodiment of the invention.
Figure 2:
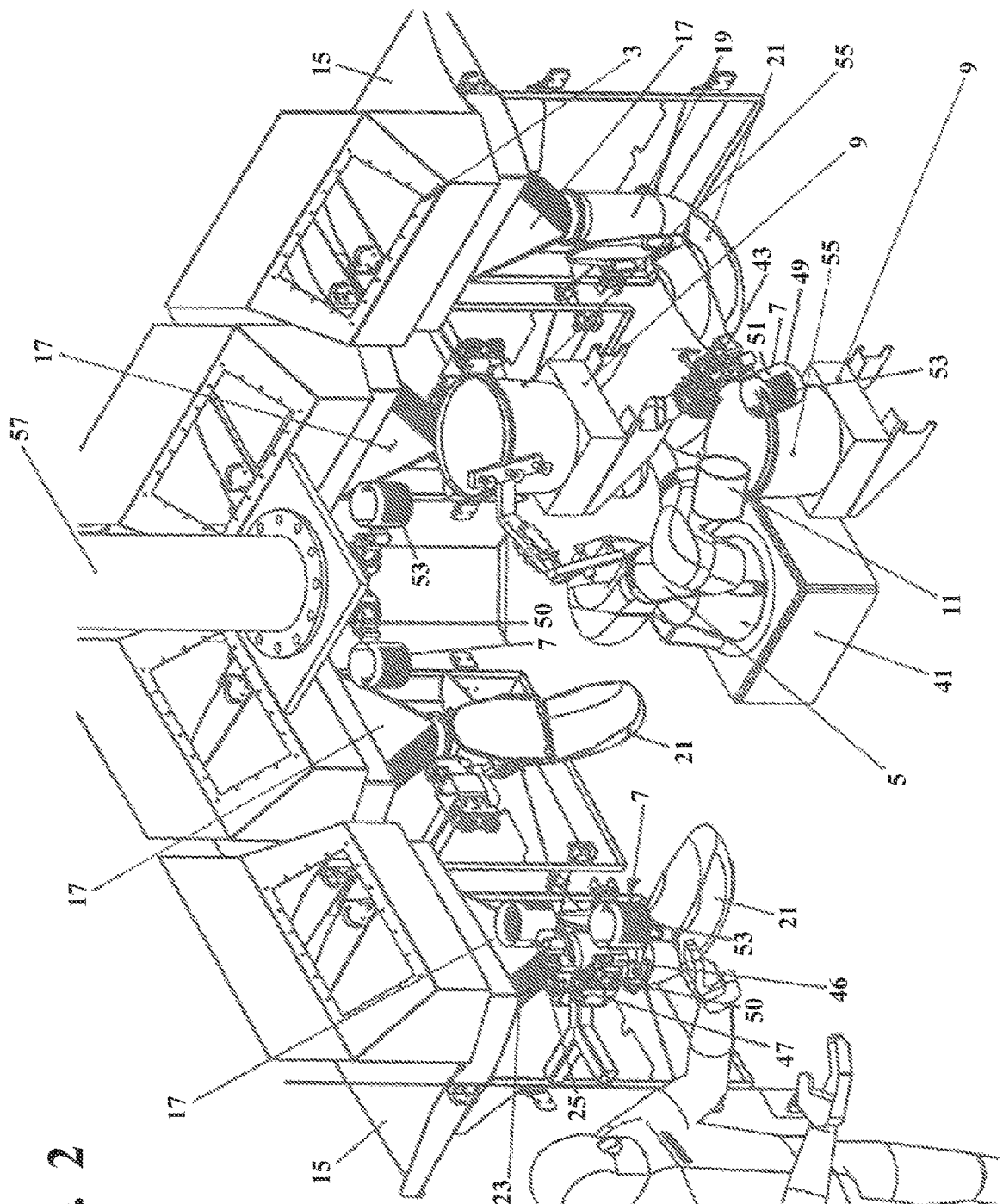
FIG. 2 is an enlarged view of part of the automated weighing system of FIG. 1.
Figure 3:
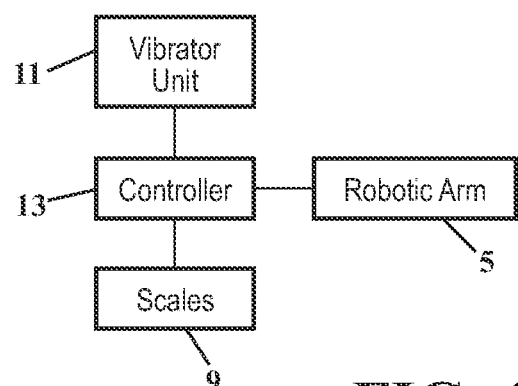
FIG. 3 is a schematic diagram showing the components connected to a weighing system controller in the weighing system of FIG. 1.

FIGS. 1 to 5c show an automated weighing system 1 according to a first embodiment of the invention. FIGS. 1 and 2 show the automated weighing system 1 in the form a weighing cell. The automated weighing system 1 includes at least one storage unit 3 for storing an foodstuff, at least one robotic arm 5, at least one transfer receptacle 7, at least one weighing device 9, at least vibrator unit 11, and an electronic control system 13.

The storage unit 3 is arranged for storing particulate flowable foodstuffs, for example powders such as flour and granules such as gravy granules. The storage unit 3 includes a loading tray 15, a hopper 17, a downpipe 19 and a trough 21. The hopper 17 is oriented in a generally vertical plane and has side walls that taper downwardly and inwardly. The hopper 17 has an upper end 23 and a lower end 25. The upper and lower ends 23,25 of the hopper are open. The loading tray 15 protrudes outwardly from the upper end 23 of the hopper in a generally horizontal orientation. The loading tray 15 is arranged to receive and support large packages of the foodstuff, for example 25 kg packages of powder/granules. The downpipe 19 connects the hopper 17 to the trough 21 and is arranged to transfer the foodstuff from the hopper 17 to the trough 21. An upper end 27 of the downpipe is connected to the lower end 25 of the hopper. A lower end 29 of the downpipe is connected to an end plate 31 of the trough, which is located towards a first, proximal 30, end of the trough. The lower end 29 of the downpipe is curved. The end plate 31 is inclined, preferably in a radial direction with respect to a base 33 of the trough. Typically the foodstuff flows from the hopper 17 to the trough 21, via the downpipe 19, under the action of gravity.

The trough 21 has an opening 22 at an upper end and provides an accessible store for the foodstuff. The trough 21 is arranged to enable the robotic arm 5 to scoop some foodstuff out of the trough 21. The robotic arm 5 manipulates the transfer receptacle 7 to remove some foodstuff from the trough 21.

The trough 21 protrudes outwardly from the downpipe 19. The downpipe 19 and trough 21 together provide a substantially J-shaped assembly.

Figure 4A:
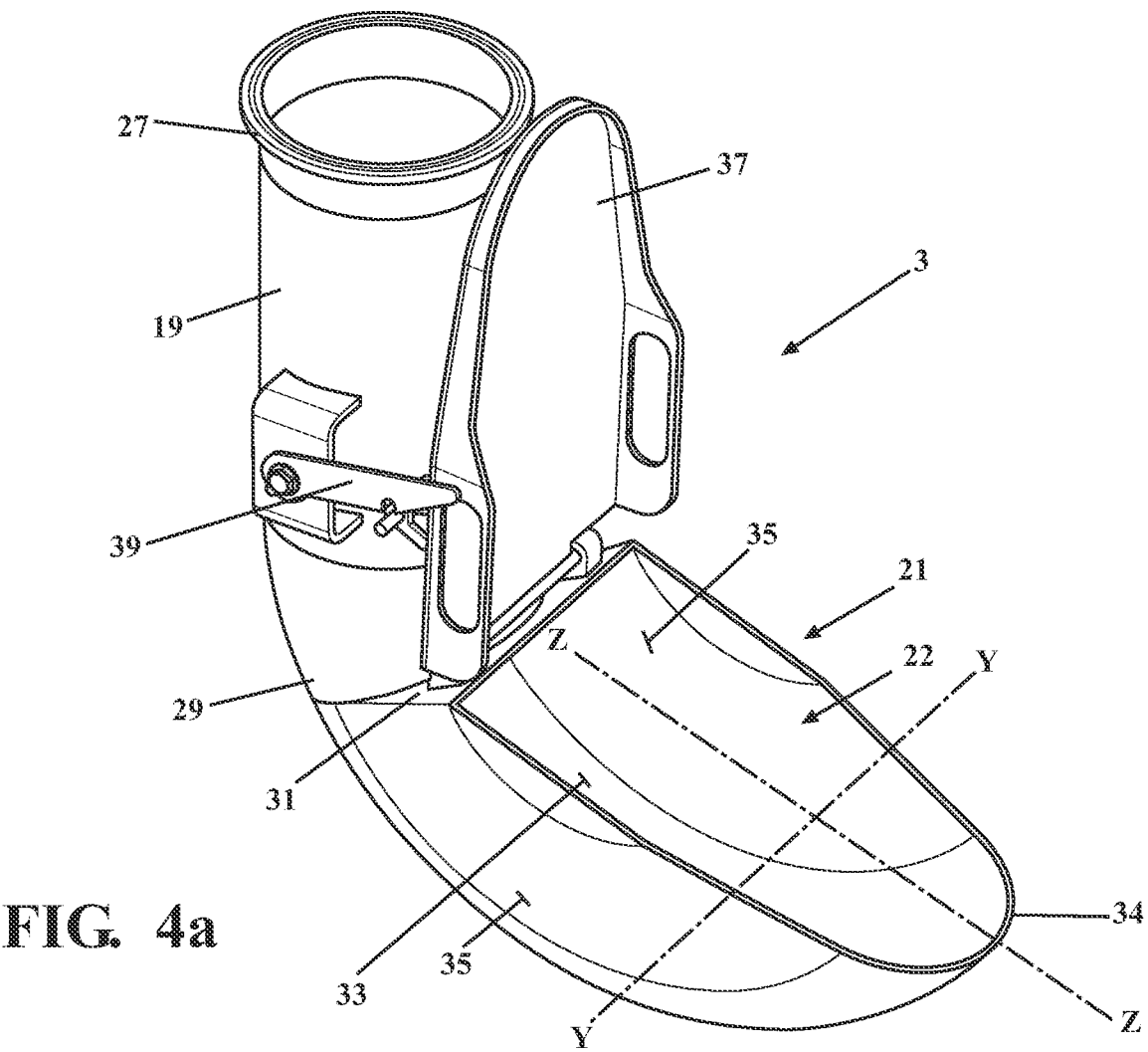
FIG. 4a is an isometric view of a foodstuff store used in the weighing system of FIG. 1.
Figure 4B:
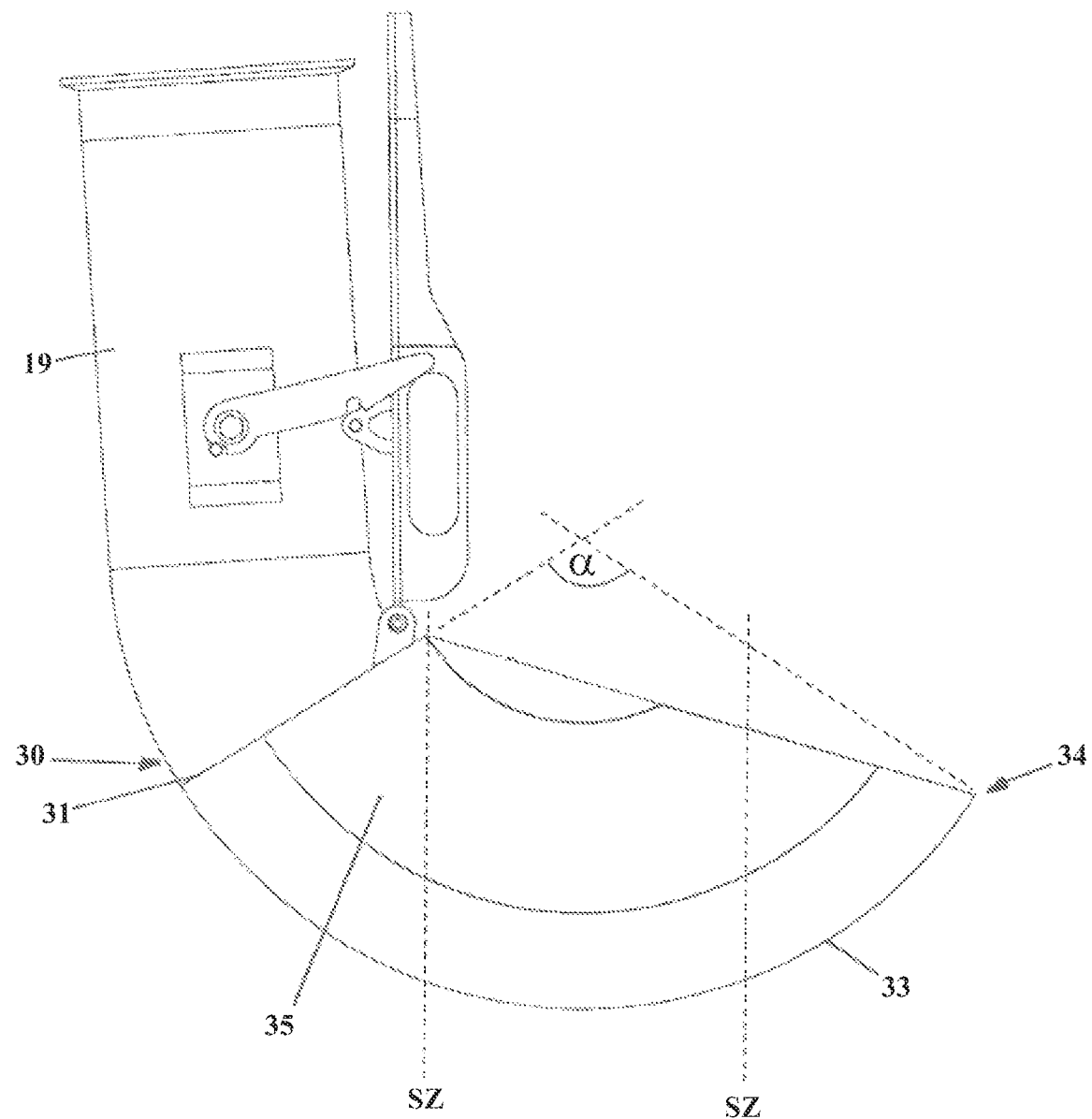

The trough base 33 is best seen in FIGS. 4a and 4b. The base 33 is arcuate in a longitudinal direction, which is illustrated by line Z-Z in FIG. 4a. This ensures that as foodstuff is removed by the transfer receptacle 7 from a scoop zone, which is indicated by lines SZ in FIG. 4b, further foodstuff falls under the action of gravity into the scoop zone SZ. Thus after each scoop of foodstuff is removed from the trough 21 the foodstuff is automatically replenished, ready for the next transfer. The inventors have found that this is the case even for foodstuffs having particles that tend to clump together and therefore don't flow so easily. For example, the base 33 can extend along an arc in the longitudinal direction through an angle $\alpha$, which is typically in the range 70° to 150°. The radius of the arc is typically in the range 180 mm to 300 mm.

The size and shape of the base 33 in the transverse direction, which is indicated by line Y-Y in FIG. 4a, is arranged to match at least part of an outer profile of the transfer receptacle 7. In the Figures the base 33 has an arcuate profile in the transverse direction. The base 33 extends in the transverse direction through an angle which is typically in the range 90° to 180°. The radius of the arc is typically in the range 25 to 300 mm. The base 33 in the transverse direction is arranged to match part of the outer profile of the transfer receptacle 7, which in this case has a substantially cylindrical shape. Thus the transfer receptacle 7 is able to move through the trough 21 very close to the base 33, thereby minimizing the amount of foodstuff that becomes trapped at the base 33 of the trough. In one example, the arcuate base 33 has a radius of around 53 mm in the transverse direction and the cylindrical transfer receptacle 7 has a radius of around 50 mm. The arrangement also helps to ensure that there are relatively small gaps between the outer profile of the transfer receptacle 7 and the side walls 35 of the trough. This helps to minimize the amount of foodstuff that sticks to side walls 35 of the trough 21 as a result of a scooping action. When a scoop of foodstuff is removed from the trough 21 the majority of the foodstuff that is forced into the gaps between the transfer receptacle 7 and the side walls 35 falls downwards towards the base 33. The side walls 35 can be inclined slightly to encourage this. For example, the side walls can flare outwards from the base 33 towards the opening 22. The side walls 35 also taper from a maximum width in a central area of the trough to a minimum width adjacent a second, distal, end 34 of the trough.

The trough 21 includes a closure member such as a door 37, which can be moved between open and closed positions. The door 37 is shown in the open position in FIGS. 4a and 4b. In the closed position, the door 37 closes off the opening 22. This helps to prevent the foodstuff from becoming contaminated when the robotic arm 5 is not in use. The door 37 can be opened and closed manually. A locking mechanism 39, such as a latch, can be used to hold the door in the open position. In addition, or alternatively, the door 37 can be open and closed automatically by means of an actuator (not shown), which is controlled by the control of the control system 13.

The robotic arm 5 comprises a multi-axis robotic arm. Preferably the robotic arm 5 has at least four axes of movement, preferably at least five axes of movement and more preferably still at least six axes of movement. The robotic arm 5 preferably includes a fixed base 41. The robotic arm 5 is arrange to pivot with respect to the fixed base 41. The robotic arm 5 includes an end effector 43 that is arranged to releaseably grip a lifting bracket 45, which is part of the transfer receptacle 7. The robotic arm 5 and the weighing system 1 are arranged such that at least one storage unit 3, at least one transfer receptacle 7, and at least one weighing device 9 are within the reach of the robotic arm 5. The robotic arm 5 under the control of the control system 13 is arranged to: move the transfer receptacle 7 from a storage location 47 to storage unit 3; to scoop some foodstuff from the trough 21 using the transfer receptacle 7; and to dispense foodstuff from the transfer receptacle 7 onto the weighing device 9. Typically the robotic arm 5 dispenses foodstuff into a container/package 55 mounted on the weighing device.

The robotic arm 5 is arranged to return the transfer receptacle 7 to the storage location 47 when the operation is completed.

The transfer receptacle 7 comprises a cylindrical cup and the lifting bracket 45. The cylindrical cup comprises a base (not shown) and a side wall 51. The lifting bracket 45 is attached to the side wall 51 and protrudes outwardly therefrom. The lifting bracket 45 has a substantially U-shaped formation 46, which provides some flexibility in the bracket 45 for promoting vibration of the receptacle 7. The lifting bracket 45 has a lifting formation 50, which is arranged to be gripped by the robot end effector 43. The lifting formation 50 comprises a castellated rectangular tubular structure. The lifting formation 50 is located more outwardly than the U-shaped formation 46 with respect to the side wall 51. At least a part of at least one of the base and the side wall 51 comprises a multiplicity of perforations 53. The perforations 53 can be, for example in the form of a mesh structure. The purpose of the perforations 53 is to enable foodstuff to be dispensed from the transfer receptacle 7 when the receptacle 7 is vibrated by the vibrator unit 11. In FIG. 2, the perforations 53 comprise a section of the side wall 51. In the arrangement shown in FIG. 2, the base is solid and part of the side wall 51 is solid. The solid base helps to minimise the loss of foodstuff while the receptacle is moved from the trough 21 to the weighing device 9.

The size of perforations 53 is determined at least in part according to the type of foodstuff to be dispensed, in particular according to the mean particle size of the foodstuff to be dispensed. The extent to which the perforations 53 extend over the receptacle at least in part determines the rate at which material is dispensed. A further consideration for perforation 53 size, and the position of the perforations 53, is loss of foodstuff while the receptacle is moved from the trough 21 to the weighing device 9. Preferably the perforations 53 are sized and/or located such that no amount, or only a small quantity, of foodstuff falls through perforations when moving from the trough 21 to the weighing device 9. Typical perforations have a size of around 0.1 mm to 10 mm. For example, 1 mm for flour and 5 mm for gravy granules.

The weighing device 9 comprises a weighing scales. The weighing device generates an electrical output signal that is indicative of the weight of the material(s) loaded onto the scales. The weighing device 9 is connected to the control system 13 by a wired, or wireless, connection and the control system 13 is arranged to receive the electrical output signal from the weighing device 9 and to determine the measured weight therefrom.

The vibrator unit 11 is preferably located adjacent the weighing device 9. The function of the vibrator unit 11 is to vibrate the transfer receptacle 7 to dispense foodstuff through the perforations 53. The vibrator unit 11 is connected to the control system 13. The output of the vibrator unit 11 is preferably variable. For example, at least one of the amplitude of vibration and the frequency of vibration can be adjusted during a weighing operation. The control system 13 controls operation of the vibrator unit 11. The control system 13 is arranged to adjust at least one of the amplitude of vibration and the frequency of vibration in order to control the flow rate of foodstuff through the perforations 53. The inventors have determined through tests that varying the amplitude of vibration tends to have the largest effect on flow rate of foodstuff through the perforations 53.

The control system 13 controls operation of the robotic arm 5. The control system 13 is programmed to move the robotic arm 5 through a sequence of movements, which includes: picking the transfer receptacle 7; moving the transfer receptacle 7 to the trough 21; scooping foodstuff from the trough 21; moving the transfer receptacle 7 to the weighing device 9; and vibrating the transfer receptacle 7 with the vibrator unit 11 to dispense foodstuff through the perforations 53 onto the weighing device 9. The control system 13 is programmed to dispense a target weight of foodstuff onto the weighing device 9. The control system 13 controls operation of the vibrator unit 11 such that initially there is a high flow rate of foodstuff dispensed through the perforations 53. The purpose of this is for the measured weight to progress to the target weight as quickly as possible. The control system 13 monitors the measured weight from the output signal received from the weighing device 9 (see FIGS. 5b and 5c). As the measured weight approaches the target weight the control system 13 controls operation of the vibrator unit 11 to reduce the extent to which the transfer receptacle 7 is vibrated. For example, the control system adjusts at least one of the amplitude of vibration and the frequency of vibration to reduce the flow rate of foodstuff through the perforations 53. This enables the final measured weight to accurately achieve the target weight. Typically the system 13 is cable of obtaining a dispensed weight that is within 1% of the target weight. Since foodstuff is dispensed at a high flow rate initially, the target weight can be achieved relatively quickly.

Typically the vibration frequency used in a weighing operation is in the range 1 Hz to 100 Hz.

Typically the vibration amplitude used in a weighing operation is in the range 0.1 mm to 10 mm, and preferably 0.5 mm to 10 mm.

The weighing system 1 typically includes a plurality of transfer receptacles 7; a plurality of storage units 3; a plurality of weighing devices 9 and a plurality of vibrator units 11. The cell shown in FIGS. 1 and 2 has a generally rectangular arrangement with the robotic arm 5 located in the centre of the cell. The cell includes six storage units 3, the troughs 21 of which protrude inwards towards the robotic arm 5. The storage units 3 are arranged in pairs on first, second and third sides of the rectangular cell. The storage units 3 can each store the same type of foodstuff, or at least one of the storage units 3 can store a different foodstuff from the other storage units 3. The cell includes two weighing devices 9. The weighing devices 9 are located on the fourth side of the rectangular cell. The weighting devices 9 can be located side by side or, as shown in FIG. 2, one weighing device 9 can be mounted above the other weighing device 9. Typically the number of vibrator units 11 matches the number of weighing devices 9. According to a programmed sequence, the robotic arm 5 can select any of the available transfer receptacles 7; move the selected transfer receptacle to any of the available storage units 3; scoop foodstuff from any of the available troughs 21; and dispense foodstuff onto any of the available weighing devices 9.

Optionally, the weighing system 1 can include lifting equipment 57, such as a crane, to move incoming foodstuff in bulk.

A simple operation of the weighing system 1 will now be described, with reference to FIG. 5a. A process worker loads a large package 59 of foodstuff onto the loading tray 15 and opens the package. The worker pours the foodstuff contents into the upper end of the hopper. The foodstuff falls under the action of gravity through the hopper 17 and downpipe 19 into the trough 21. Typically there is a sufficient quantity of foodstuff to fill at least part of the trough 21 volume and at least part of the downpipe 19 volume.

The control system 13 moves the robotic arm 5 so that the end effector 43 is adjacent the receptacle lifting bracket 45. The end effector 43 grips the lifting bracket 45. The transfer receptacle 7 is now under the control of the robotic arm 5 and control system 13.

The control system 13 moves A the robotic arm 5 such that the transfer receptacle 7 is located adjacent the trough 21. The control system 13 moves the robotic arm 5 such that the transfer receptacle 7 scoops B foodstuff from the trough 21. When foodstuff is removed from the trough 21 further foodstuff falls under the action of gravity from the downpipe 19 into the scoop zone SZ of the trough 21, ready for the next scooping action.

The transfer receptacle 7 is oriented upright after the scooping action to retain the foodstuff in the receptacle 7. The control system 13 moves C the robotic arm 5 such that the transfer receptacle 7 is located above the weighing device 9 and such that the transfer receptacle 7 engages the vibrator unit 11. A container/package 55, such as a plastic tub or bag, is located on the weighing device 9.

The control system 13 activates the vibrator unit 11 in a first operational condition having a first amplitude of vibration. The vibrator unit 11 vibrates D the transfer receptacle 7 which causes foodstuff to dispense at a first flow rate through the perforations 53 onto the weighing device 9. The foodstuff collects in the container/package 55.

Figure 5B:
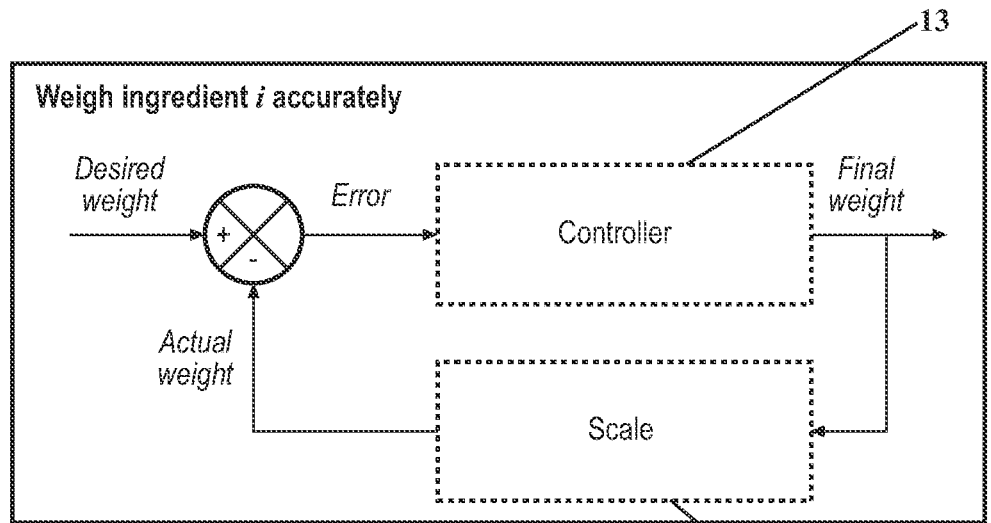
FIG. 5b is a flow diagram showing the control arrangement for achieving an accurate target weight.
Figure 5C:
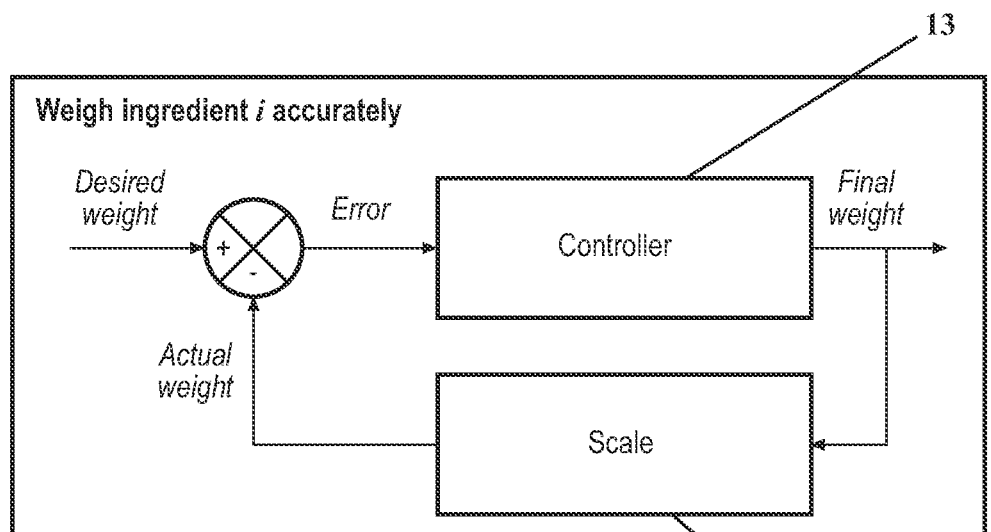
FIG. 5c is a is a flow diagram showing the control arrangement for achieving an accurate target weight.

The control system 13 monitors E the measured weight from the output signal received from the weighing device 9 (see FIGS. 5b to 5c). When the measured weight reaches a predetermined fraction of the target weight, for example 90% of the target weight, the control system 13 switches the vibrator unit 11 to a second operational condition having a second amplitude of vibration which causes foodstuff to dispense at a second flow rate through the perforations 53 onto the weighing device 9. The second amplitude of vibration is less than the first amplitude of vibration and the second flow rate is less than the first flow rate. Typically the second flow rate is approximately 10 to 30% of the first flow rate.

Optionally, when the measured weight reaches a second predetermined fraction of the target weight, for example 98% of the target weight, the control system controls 13 switches the vibrator unit 11 to a third operational condition having a third amplitude of vibration which causes foodstuff to dispense at a third flow rate through the perforations 53 onto the weighing device 9. The third amplitude of vibration is less than the second amplitude of vibration and the third flow rate is less than the second flow rate. Typically the third flow rate is approximately 5 to 10% of the first flow rate.

Using the first and second, and optionally the third, flow rates enables the final measured weight to quickly achieve the target weight, with an acceptable degree of accuracy.

The vibration frequency may be held substantially constant during the first, second and third operational conditions.

When the measured weight reaches the target weight, the control system 13 controls the robotic arm 5 to move the transfer receptacle 7 out of engagement with the vibrator unit 11 which causes the foodstuff to cease flowing through the perforations 53. Additionally, or alternatively, the control system 13 can switch off the vibrator unit 11. The container/package 55 is removed from the scales. If the container/package 55 is not the final packaging for the weighed foodstuff, the weighed foodstuff is transferred into its final packaging.

The scooping and dispensing steps are repeated F the required number of times.

When the weighing system 1 cell has a plurality of storage units 3, transfer receptacles 7, weighing devices 9 and vibrator units 11, foodstuff may be scooped from the storage unit troughs 21 in any desirable sequence, using any available transfer receptacle 7, and dispensed at the weighing devices 9 in any desirable sequence. The operational conditions of the vibrator unit 11 and the perforations size 53 are at least in part determined by the foodstuff being dispensed, and the operational conditions, for example the local temperature and humidity. The size and power rating of the vibrator unit 11 will also affect the operational conditions selected.

A weighing system 101 in accordance with a second embodiment of the invention is shown in FIGS. 8 to 16, 5b and 5c.

Figure 8:
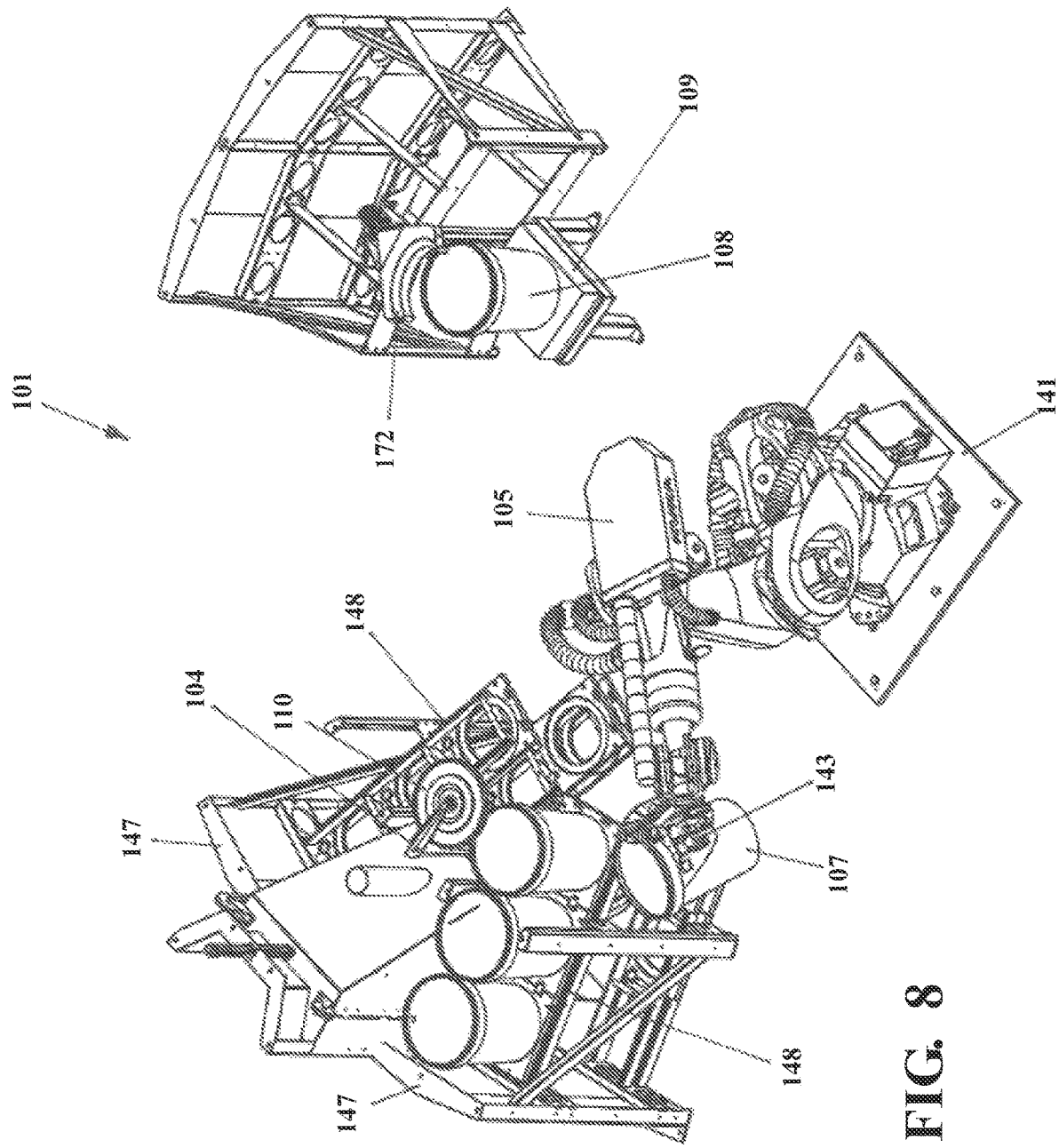
FIG. 8 is a diagrammatic view of part of an automated weighing system according to a second embodiment of the invention, which includes a robotic arm.
Figure 9:
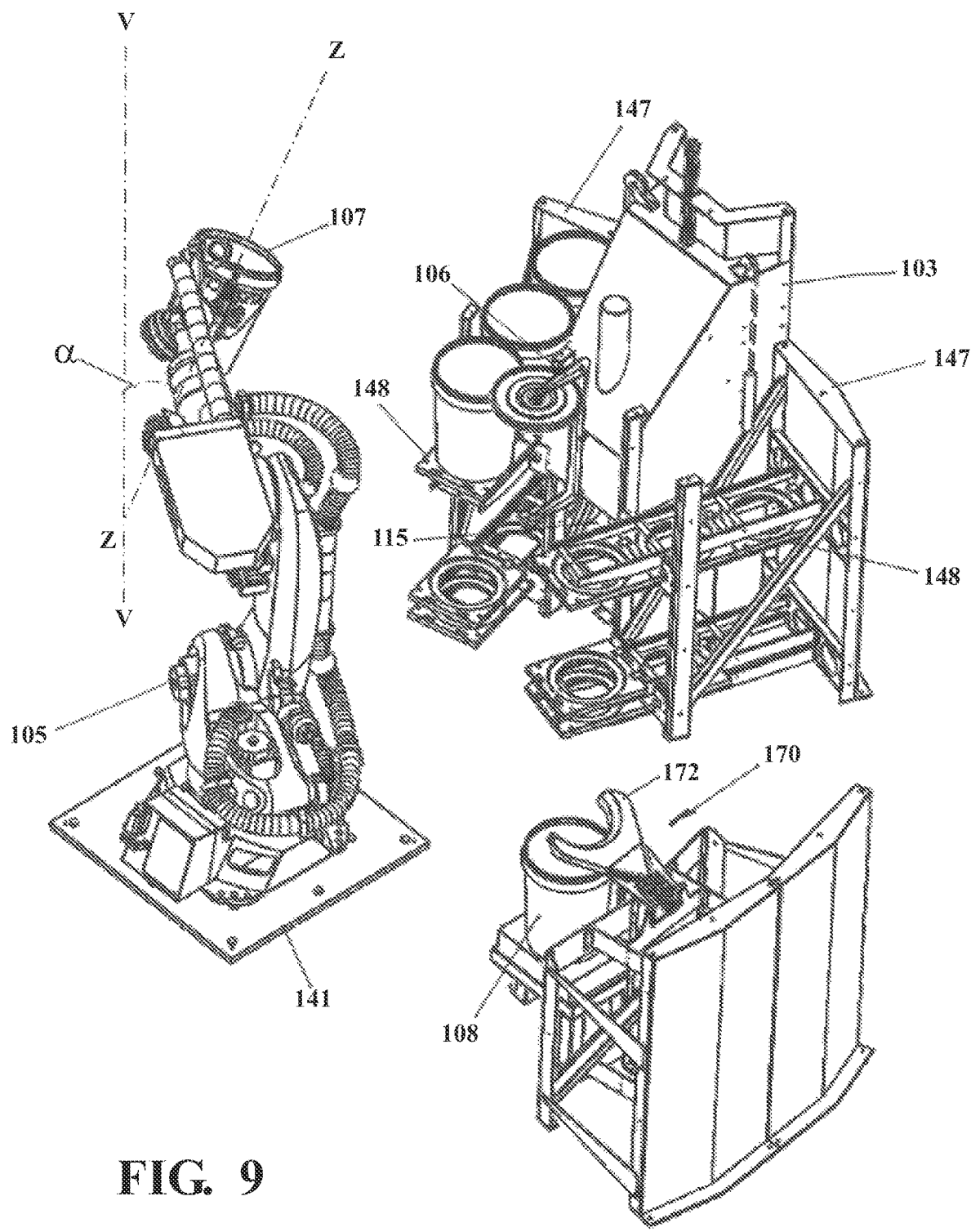
FIG. 9 is another view of the embodiment of FIG. 8.

FIGS. 8 and 9 show the automated weighing system 101 in the form a weighing cell. The automated weighing system 101 includes at least one robotic arm 105, at least one transfer receptacle 107, at least one weighing device 109, at least vibrator unit 111, and an electronic control system 113.

The weighing device 109 is similar to the weighing device 9 in the first embodiment. The weighing device generates an electrical output signal that is indicative of the weight of the material(s) loaded onto the scales. The weighing device 109 is connected to the control system 113 by a wired, or wireless, connection and the control system 113 is arranged to receive the electrical output signal from the weighing device 9 and to determine the measured weight therefrom.

The transfer receptacle 107 preferably comprises an approximately cylindrical container, having a base 107a and side wall 107b, and has an open upper end 107c, for example similar to a cup, barrel or pan. Each of the base 107a and side wall 107b is solid, that is, it does not include perforations. The receptacle 107 can be made from any suitable material, for example a suitable plastic such as PVC, or a suitable metal such as stainless steel. The receptacle 107 includes a rim 107d that extends around the open upper end 107c. Optionally each container can provided with a lid 110. A typical receptacle 107 has a volume of around 40 to 80 litres, and is preferably around 60 litres.

The automated weighting system includes at least one filling station 103. In a typical cell the system may include 1 to 4 filling stations 103. Each filling station 103 may include a hopper (not shown). Each filling station 103 is arranged to receive and store particulate materials such as flowable foodstuffs. The particulate material can be for example powders such as flour and granules such as gravy granules. Each filling station 103 includes a receptacle receiving location 115 located beneath the hopper. A quantity of particulate material can be placed into the receptacle 107 from the hopper. Inserting particulate material into the receptacle 107 can be done manually, for example a process working emptying sacks of material into the hopper or an automated process can be used. Each filling station 103 can include a lid holding device 104. The lid holding device is arranged to hold the lid 110 of the transfer receptacle 107.

Typically, the automated weighing system 101 includes at least one receptacle storage station 147 (see FIGS. 8 and 9). A typical cell may include between 1 to 8 receptacle storage stations 147. Each receptacle storage station 147 is arranged to store several receptacles 107 arranged in a manner that is accessible to the robotic arm 105. For example, the receptacle storage station 147 can include at least one rack 148, and preferably a plurality of racks 148, wherein a plurality of receptacles 107 are lined up for removal by the robotic arm. For example, each rack 148 can be arranged such that the receptacles 107 are queued in a line and the robotic arm 105 is arranged to select the front receptacle 107 from the queue. A plurality of racks 148 can be incorporated into a racking unit, for example a plurality of racks 148 can be stacked one on top of the other. The number of racks 148 in the racking unit is in part dependent upon the size of the receptacles 107 and the reach of the robotic arm 105. Typically each racking unit includes 1 to 4 racks 148 of receptacles 147, and preferably 2 or 3 racks. A preferred arrangement is to have a racking unit, having a plurality of receptacle storage racks 148 located either side of the filling station 103.

A typical cell includes 1 or 2 robotic arms 105. Each robotic arm 105 comprises a multi-axis robotic arm. Preferably the robotic arm 105 has at least four axes of movement, preferably at least five axes of movement and more preferably still at least six axes of movement. Each robotic arm 105 preferably includes a fixed base 141. Each robotic arm 105 is arranged to pivot with respect to the fixed base 141. Optionally, each robotic arm 105 can be mounted on a plinth (not shown) to increase the height to with the robotic arm 105 can reach. Each robotic arm 105 includes an end effector 143 that is arranged to engage, lift and move the transfer receptacle 107. The weighing system 101 is arranged such that at least one filling station 103, at least one transfer receptacle 107, and at least one weighing device 109 are within the reach of the robotic arm 105. Each robotic arm 105 is under the control of the control system 113 is arranged to: move an empty transfer receptacle 107 from a storage location 147 to one of the filling stations 103, where it is filled with particulate material; to move the filled transfer receptacle 107 to a position adjacent the weighing device; and to dispense particulate material from the transfer receptacle 107 into a container 108, which is mounted on the weighing device 109. The container 108 can be similar to the transfer receptacle 107, or can have a different configuration therefrom.

The robotic arm end effector 143 is shown in FIGS. 10 to 15.

The end effector 143 includes an engagement plate 144 that is arranged to engage at least part of the side wall 107b. The engagement plate 144 is preferably shaped to match the shape of a part of the side wall 107b that it engages, so that there is a snug fit between a front face 144a and the side wall 107b of the container. In this instance, since the part of the side wall 107b that is engaged by the engagement plate is curved, consequently the engagement plate 144 comprises a curved plate. The engagement plate 144 has an upper face 146 that is arranged to engage the rim 107d. Typically the upper face 146 engages an underside of the rim 107d in use. The weight of the transfer receptacle 107, and the material stored therein, is largely supported by the upper face 146 of the engagement plate acting on the rim 107d.

The end effector can include a locking system 148. The locking system 148 includes at least one locking member that is arranged to clamp the transfer receptacle 107 to the engagement plate 144. For example, the locking member can be arranged to clamp the rim 107d to the upper face 146 of the engagement plate. Preferably the locking system 148 includes at least one linear actuator 150, which includes a rod 152 and a clamping member 156 located at a distal end of the rod 152. The rod 152, and hence the clamping member 156 attached thereto, is arranged to move along a linear path between a locking position and a non-locking position. In the locking position, the clamping member 156 is arranged to clamp the rim 107d to the upper face 146 of the engagement plate, thereby firmly holding the transfer receptacle 107 to the engagement plate 144. To release the transfer receptacle 107 the rod 152 and hence the clamping member 156, are moved to the non-locking position. This enables end effector 143 to disengage the transfer receptacle 107. The control system 113 is arranged to control operation of the locking system 148. For example, the control system 113 can be arranged to control operation of the linear actuator 150. In the arrangement shown in the Figures, two linear actuators 150 are provided. The control system 113 controls operation of each of the linear actuators. Typically, the linear actuators 150 are operated in a synchronous fashion by the control system 113. Typically each linear actuator 150 is a pneumatic linear actuator (sometimes referred to as a pneumatic cylinder). The locking system 148 can include limit switches, such as reed switches, to enable the control system 113 to determine when the clamping members 156 have reached the locking and/or non-locking positions.

Each linear actuator 150 is arranged with respect to the engagement plate 144 such that the longitudinal axis of the rod 152 is perpendicular the upper engagement face 146. Each linear actuator 150, is located behind a rear face 144b of the engagement plate.

The end effector can include a vacuum system 158. The vacuum system 158 is arranged to suck the transfer receptacle 107 into a tight engagement with the engagement plate 144, and in a preferred arrangement the side wall 107b of the transfer receptacle into tight engagement with the front face 144a of the engagement plate. This improves the stability of the connection between the transfer receptacle 107 and the end effector 143 and also helps to bear the load of the transfer receptacle 107 and the particulate material stored therein. The vacuum system 158 is controlled by the control system 113. Typically, the vacuum system 158 is only operated when the transfer receptacle 107 is carry particulate material, since it is not generally needed in an unloaded condition. The control system 113 is able to determine if the receptacle 107 is loaded on the basis of the location from which the transfer receptacle 107 is engaged. For example, if the end effector 143 engages the receptacle 107 at the filling station, the control system 113 assumes that the receptacle 107 is loaded with material and actuates the vacuum system 158. Likewise, if the end effector 143 engages the receptacle 107 at a receptacle storage station 147, it assumes that the receptacle 107 is empty and does not actuate the vacuum system 158. Alternatively a suitable sensor can be provided to determine if the receptacle 107 is carrying material and the control system 113 can be arranged to control operation of the vacuum system in response to signals received from that sensor.

The vacuum system 158 includes at least one suction cup 160, and preferably a plurality of suction cups 160. Typically the vacuum system includes between 1 to 10 suction cups. Four suction cups 160 are shown in the Figures. Each suction cup 160 is arranged to engage the side wall 107b of the transfer receptacle when the transfer receptacle 107 is engaged by the end effector 143. Each suction cup 160 is either substantially flush with the front face 144a of the engagement plate or protrudes outwards a little from the front face 144a of the engagement plate. For example the engagement plate 144 can include at least one hole 162 that extends through the plate 144 from front to back that is arranged to receive the suction cup 160. A hole 162 can be provided for each suction cup 160. Appropriate piping or tubing (not shown) can connect each suction cup 160 to a negative pressure source (not shown). The piping or tubing is typically located on a rear side of the engagement plate 144.

An end portion of the robotic arm 105 engages a boss 164 mounted on a rear side of the end effector. The end portion of the robotic arm 105 is bolted to the end effector 143 and therefore the end effector 143 moves with the robotic arm 105.

The end effector 143 includes a vibrator unit 111. The function of the vibrator unit 111 is arranged to vibrate the transfer receptacle 107 when attached to the end effector 143 to dispense foodstuff through the open end 107c of the transfer receptacle. The vibrator unit is preferably in the form of an impact unit that includes a piston having an engagement head 112. The piston is arranged to move along a linear path in a reciprocating fashion such that the engagement head 112 repeatedly impacts the side wall 107b of the transfer receptacle.

This causes the transfer receptacle 107 to vibrate. Preferably an engagement face 112a of the engagement head is shaped to match the curvature of the side wall 107b.

Typically the vibrator unit 111 is mounted on a rear side of the end effector 143. The engagement plate 144 includes a through hole 166, which enables the engagement head 112 to pass through the engagement plate 144 so that the engagement head 112 is able to contact the side wall 107b of the receptacle.

The vibrator unit 111 is attached to the engagement plate 144 via damping members 168. The damping members 168 are arranged to reduce vibrational energy being transferred from the vibrator unit 111 to the robotic arm 105 during operation. The damping members 168 can be for example blocks of elastomeric material. This helps to prevent damage being caused to the robotic arm 105 as a result of operating the vibrator unit 111.

The vibrator unit 111 is connected to the control system 113. The output of the vibrator unit 111 is preferably variable. For example, at least one of the amplitude of vibration and the frequency of vibration can be adjusted during a weighing operation. The control system 113 controls operation of the vibrator unit 111. The control system 113 is arranged to adjust at least one of the amplitude of vibration and the frequency of vibration in order to control the rate at which particulate material is dispensed from the transfer receptacle 107. The control system 113 is arranged to control operation of the vibrator unit 111 in response to signals received from the weighing device 109 in order to control the rate at which particulate material is dispensed from the transfer receptacle. For example, the control system 113 can be arranged to dispense material from the container at a first rate early in the dispensing operation and at a second rate as signals received from the weighing device 109 indicates that the material received on the scales is approaching a target weight. Typically the first flow rate is higher than the second flow rate. That is, the control system 113 can be arranged to reduce the dispensing flow rate as the target weight is approached. During a weighing operation the control system 113 can be arranged to make several adjustments to the vibration amplitude and/or vibration frequency in order to adjust the flow rate.

The inventors have determined through tests that varying the amplitude of vibration tends to have the largest effect on flow rate of foodstuff out of the transfer receptacle. Essentially, the vibrator unit 111 fluidises the particulate material within the transfer receptacle 107, and the particulate material tends to behave in the manner of a non-Newtonian liquid.

Another factor in determining the flow rate of material out of the transfer receptacle 107 is the angle of inclination α of the transfer receptacle 107. The angle of inclination α of the transfer receptacle 107 is the angle subtended by a central longitudinal axis Z-Z of the transfer receptacle 107 with the vertical V-V (see FIG. 9). The control system 113 is arranged to control the robotic arm 105 to adjust the angle of inclination α of the transfer receptacle 107 during a dispensing operation in response to signals received from the weighing device 109. This is achieved by adjusting the orientation of the end effector 143, for example by rotating a wrist portion of the robotic arm 105. The control system 113 can be arranged to adjust the orientation of the transfer receptacle from a first angle of inclination α to a second angle of inclination α. The first angle of inclination α is typically used at an early stage of a dispensing operation in order to dispense material from the transfer receptacle more quickly. The second angle of inclination α is typically used at later stage of a dispensing operation, when the amount of material dispensed from the transfer receptacle 107 approaches a target weight, in order to dispense material from the transfer receptacle more slowly. Typically the first angle of inclination α is greater than the second angle of inclination α. During a weighing operation the control system 113 can be arranged to actuate the robotic arm 105 to make several changes to the angle of inclination α of the transfer receptacle in response to the signals received from the weighing device 109. Thus the control system 113 may make several adjustments to the angle of inclination α in order to adjust the flow rate.

The robotic arm 105 is arranged to return the transfer receptacle 107 to the storage location 147 when the operation is completed, or to a cleaning station.

The control system 113 controls operation of the robotic arm 105. The control system 113 is programmed to move the robotic arm 105 through a sequence of movements, which includes: picking the transfer receptacle 107; moving the transfer receptacle 107 to the filing station 103; moving the filled transfer receptacle 107 to the weighing device 109; adjusting the orientation of the transfer receptacle so that it is inclined to the vertical V-V; and vibrating the transfer receptacle 107 with the vibrator unit 111 to dispense foodstuff through the open end 107c on to the weighing device 109. The control system 113 is programmed to dispense a target weight of foodstuff onto the weighing device 109. The control system 113 controls operation of the vibrator unit 111 and/or the angle of inclination α of the transfer receptacle 107 such that initially there is a high flow rate of foodstuff dispensed from the transfer receptacle 107. The purpose of this is for the measured weight to progress towards the target weight as quickly as possible. The control system 113 monitors the measured weight from the output signal received from the weighing device 109 (see FIGS. 5b and 5c). As the measured weight approaches the target weight the control system 113 controls operation of the vibrator unit 111 and/or the robotic arm 105 to adjust the angle of inclination α of the transfer receptacle 107 in order to reduce the rate at which material is dispensed from the transfer receptacle 107 on to the weighing device 109. For example, the control system 113 can be arranged to control the vibrator unit 111 to reduce the extent to which the transfer receptacle 107 is vibrated, by reducing the amplitude and/or frequency of vibration; and/or the control system 113 can be arranged to control the robotic arm 105 to reduce the angle of inclination α of the transfer receptacle 107. This enables the control system 113 to ensure that the final measured weight substantially matches the target weight in a relatively short period of time. Typically the control system 113 is cable of obtaining a dispensed weight that is within 1% of the target weight. Since foodstuff is dispensed at a high flow rate initially, the target weight can be achieved relatively quickly. The control system 113 can be programmed to achieve the target weight within a predetermined period of time, for example within 30 seconds. In this instance, the control system 113 adjusts the vibrator unit 111 and/or the angle of inclination α, to achieve the desired target weight within the predetermined time period.

Typically the vibration frequency used in a weighing operation is in the range 1 Hz to 100 Hz.

Typically the vibration amplitude used in a weighing operation is in the range 0.1 mm to 10 mm, and preferably 0.5 mm to 10 mm.

The weighing system includes a local ventilation system 170. A ventilation unit cowling 172 is located adjacent the container 108 on the scales 109. The ventilation unit cowling 172 is pivotally attached to a mounting 174. The ventilation unit cowling 172 is pivoted downwards to a first, operational, position adjacent the container 108 during a weighing operation. When the weighing operation is completed the ventilation unit cowling 172 is arranged to pivot upwards away from the container 108 to a second, non-operational, position. This enables the container 108 to be removed from the weighing device 109. The control system 113 can be arranged to control operation of the ventilation system 170. For example, the control system 113 can be arranged to control operation of the ventilation unit cowling 172 to move it between the first and second positions.

Figure 10:
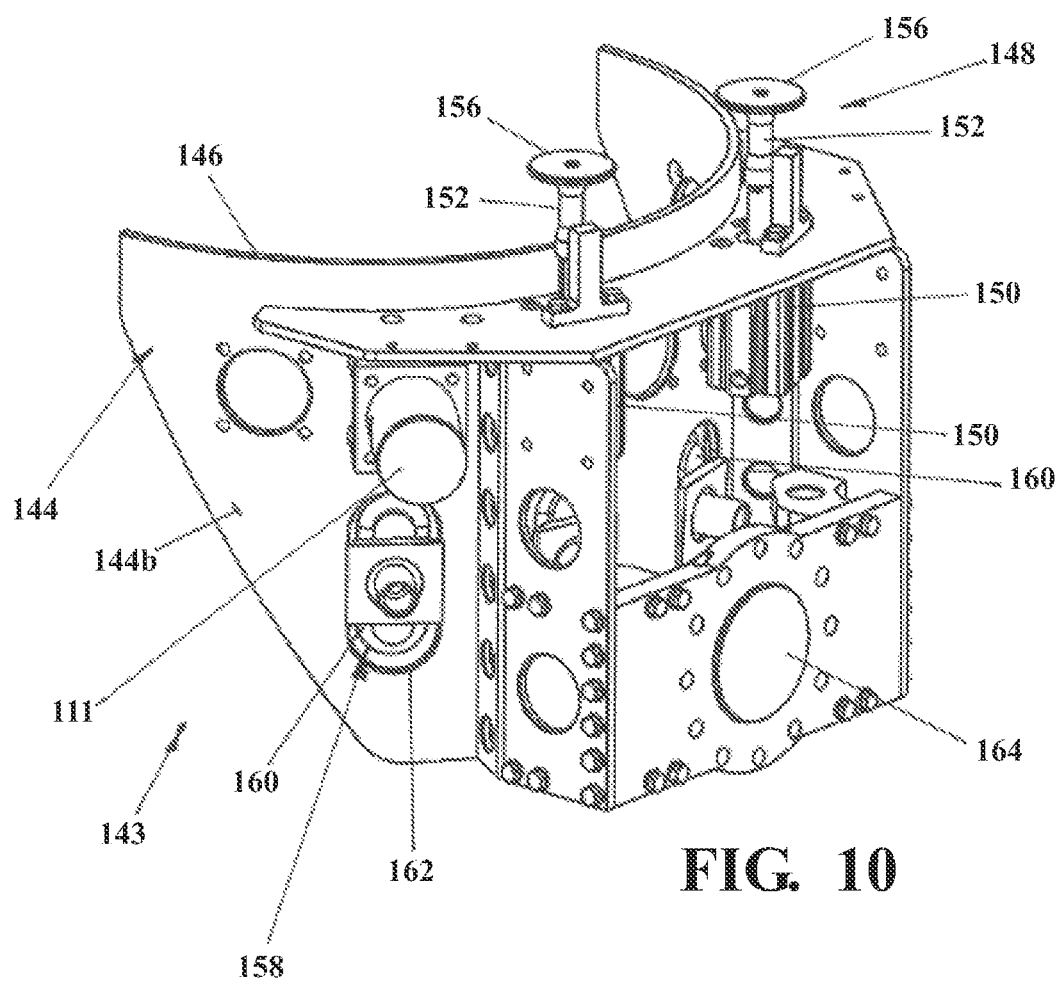
FIG. 10 is an isometric rear and side view of an end effector for the robotic arm shown in FIG. 8.
Figure 11:
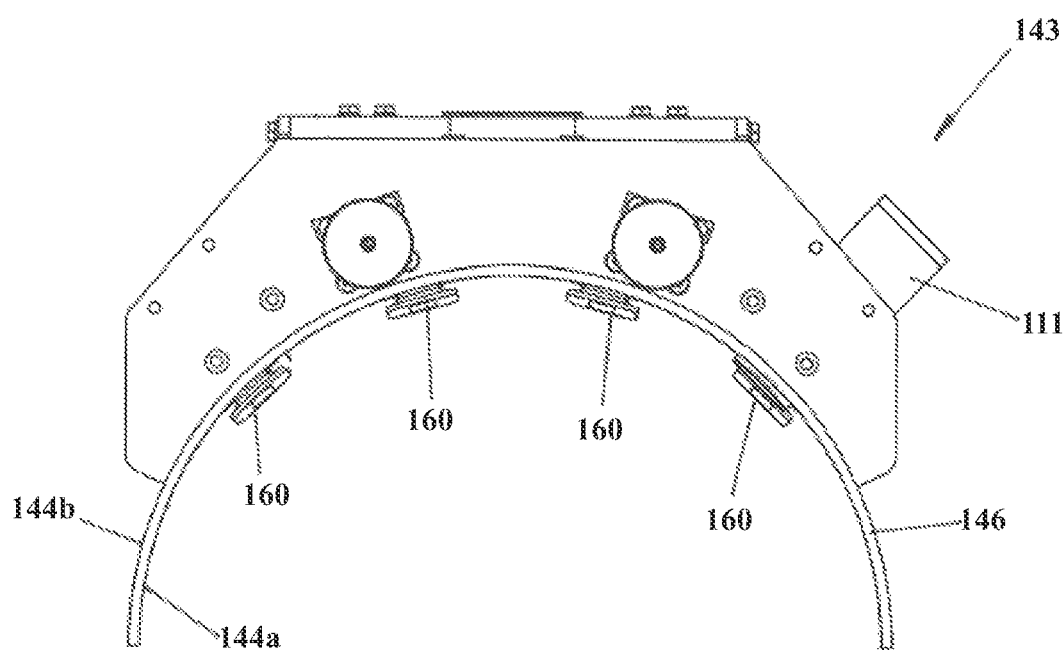
FIG. 11 is plan view from above of the end effector of FIG. 10.
Figure 14:
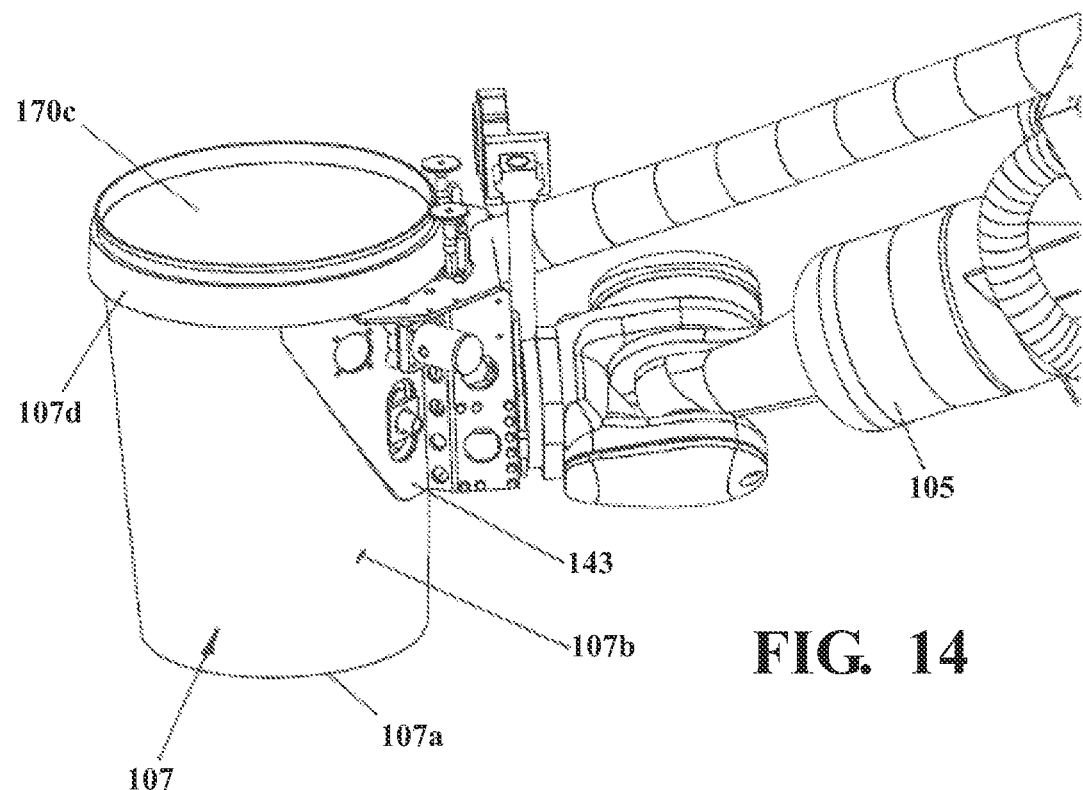
FIG. 14 is an enlarged view of part of the robotic arm, end effector and a container carried by the robotic arm shown in FIG. 8.
Figure 15:
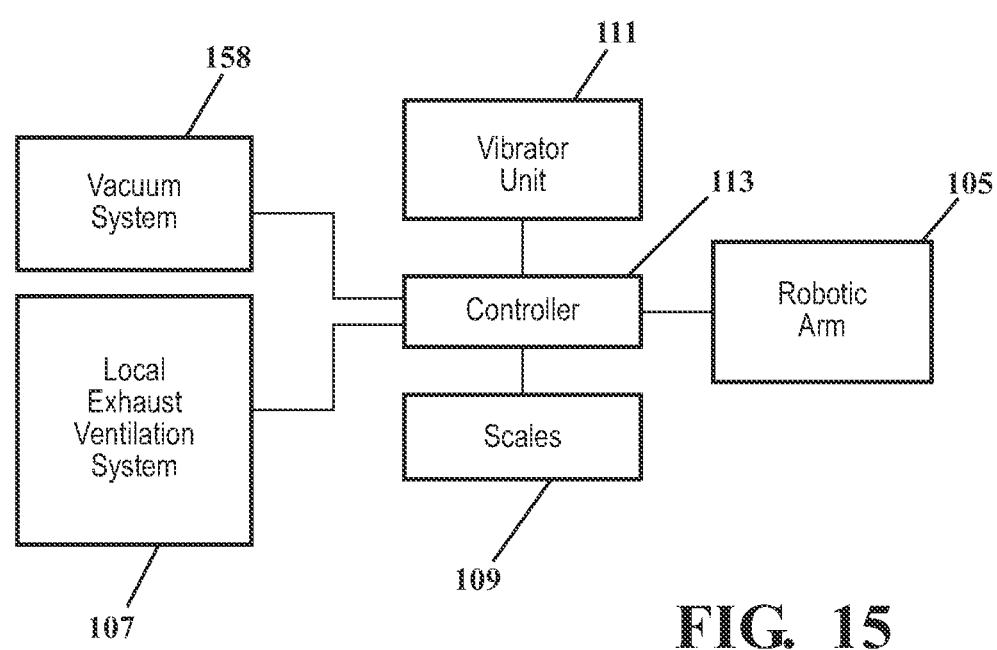
FIG. 15 is a schematic diagram showing the components connected to a control system used in the weighing system of FIG. 8.

The weighing system 101 typically includes a plurality of transfer receptacles 107; a plurality of filing stations 103; a plurality of receptacle storage stations 147; a plurality of transfer receptacles 107; a plurality of weighing devices 109 and at least one robotic arm 105. A part of a cell is shown in FIGS. 9 and 10 has a generally circular arrangement with the robotic arm 105 located in the centre of the cell. A complete cell may include, for example: two filling stations 103, four receptacle storage locations 147, two weighing devices 109 and a robotic arm 105. The robotic arm 105 is located in the centre of the cell. The filling stations 103 are located opposite to one another, with the robotic arm 105 located in between. The weighing stations 109 are located opposite to one another with the robotic arm 105 located in between. According to a programmed sequence, the robotic arm 105 can select any of the available transfer receptacles 107; move the selected transfer receptacle 107 to any of the available filing stations 103, where particulate foodstuff materials are inserted into the receptacle 107; move the filled transfer receptacle 107 to one of the available weighing devices 109, and to dispense the particulate material into a container 108 located on the weighting device.

In some instances, it can be desirable to dispense more than one type of particulate foodstuff ingredient into the container. In this instance, the robotic arm 105 would move a subsequent transfer receptacle 107 to one of the available filling stations 103. A subsequent particulate material is inserted into the subsequent transfer receptacle 107. The robotic arm 105 moves the subsequent transfer receptacle 107 to the weighing device 109 and dispenses the subsequent material into the container 108 on the weighing device 105. This step can be repeated for as many ingredients as is required. In this fashion, it is possible to dispense a plurality of different ingredients into the container 108 on the weighing device. The control system 113 knows the required amount of each ingredient and can accurately control the amount of each ingredient dispensed to obtain the correct mixture of ingredients.

A simple operation of the weighing system 101 will now be described with reference to FIG. 16.

The control system 113 moves the robotic arm 105 so that the end effector 143 engages an empty transfer receptacle 107, located at the storage location 147. The end effector 143 engages the receptacle 107 so that the front face 144a of the engagement plate contacts the side wall 107b of the receptacle and the upper face 146 of the engagement place engages the rim 107d. The control system actuates the locking system 148 to clamp the rim 107d to the upper face 146. Thus the clamping members 156 are moved from the non-locking position to the locking position. The transfer receptacle 107 is now under the control of the robotic arm 105 and control system 113.

Figure 16:
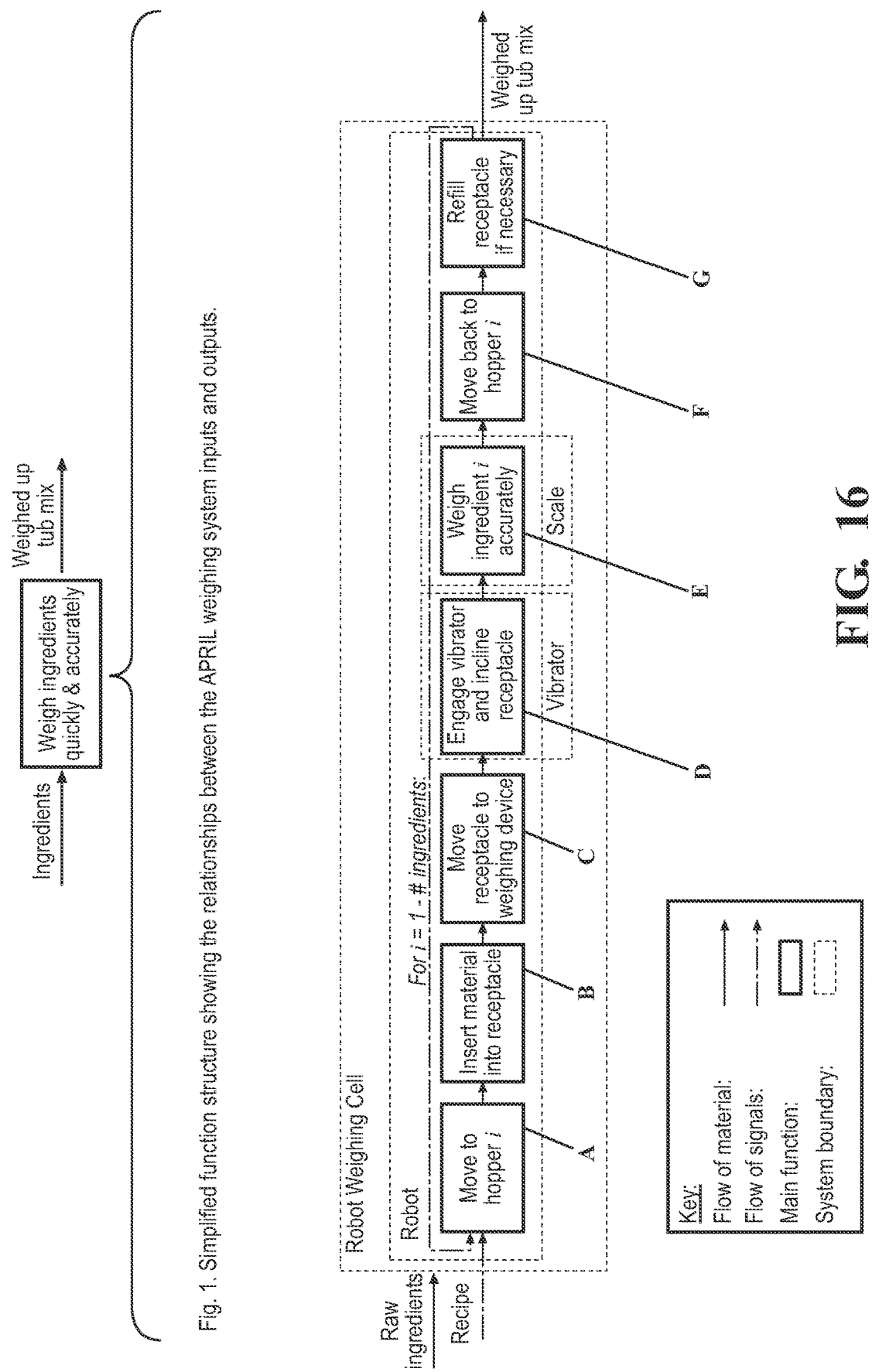
FIG. 16 is a flow diagram showing weighing system inputs and outputs.

The control system 113 operates the robotic arm 105 to move (FIG. 16: A) the transfer receptacle 107 to the filling station 103. At this stage the robotic arm 105 can remain attached to the receptacle 107 if loading is relatively quick. Alternatively the control system can instruct the robotic arm 105 to disengage the receptacle 107, by moving the clamping members 156 to the non-locking position, which enables the robotic arm to complete other tasks.

A process worker loads a large package of foodstuff onto a filling station 103 loading tray and opens the package. The worker pours the foodstuff contents into the upper end of the hopper. The foodstuff falls (FIG. 16: B) under the action of gravity through the hopper into the transfer receptacle 107 located below. Alternatively, this can be an automated process.

If necessary, the control system 113 instructs the robotic arm to reengage the filled receptacle 107.

Since the control system 113 is now moving the receptacle 107 away from the filling station 103 it assumes that the receptacle 107 filled with material and therefore the control system actuates the vacuum system 158, which creates a negative pressure in the suction cups 160. The negative pressure sucks the side wall 107b into engagement with the suction cups 160 and holds the side wall 107b in close engagement with the engagement plate 144.

The control system 113 operates the robotic arm to move (FIG. 16: C) the transfer receptacle 107 to a position adjacent the weighting device 109. The receptacle is located above the container 108 mounted on the weighing device 109.

The control system 113 activates (FIG. 16: D) the vibrator unit 111 and adjusts the angle of inclination α of the transfer receptacle 107, such that the vibrator unit 111 has a first operational condition having a first amplitude of vibration and a first frequency of vibration, and the transfer receptacle 107 has a first angle of inclination α. The first angle of inclination α is sufficiently inclined to be a dispensing angle. The vibrator unit 111 vibrates the transfer receptacle 107 which causes foodstuff to dispense at a first flow rate through the open end 107c into the container 108 on the weighing device 109. The foodstuff collects in the container 108.

The control system 113 monitors (FIG. 16: E) the measured weight from the output signal received from the weighing device 109 (see FIGS. 5b to 5c). When the measured weight reaches a predetermined fraction of the target weight, for example 90% of the target weight, the control system 113 switches the vibrator unit 111 to a second operational condition having a second amplitude of vibration and/or a second frequency of vibration (wherein the second amplitude of vibration is different from the first amplitude of vibration and/or the second frequency of vibration is different from the first frequency of vibration); and/or adjusts the angle of inclination α to a second angle of inclination (wherein the second angle of inclination is different from the first angle of inclination), which causes foodstuff to dispense from the transfer receptacle 107 at a second flow rate into the container 108 on the weighing device 109. The second flow rate is less than the first flow rate so that high accuracy can be achieved. Typically, the second amplitude of vibration is less than the first amplitude of vibration, the second frequency of vibration is less than the first frequency of vibration, and/or the second angle of inclination α is less than the first angle of inclination α. Typically the second flow rate is approximately 10 to 30% of the first flow rate.

Optionally, when the measured weight reaches a second predetermined fraction of the target weight, for example 98% of the target weight, the control system 113 switches the vibrator unit 111 to a third operational condition having a third amplitude of vibration and/or a third frequency of vibration (wherein the third amplitude of vibration is different from the second amplitude of vibration and/or the third frequency of vibration is different from the second frequency of vibration); and/or adjusts the angle of inclination α to a third angle of inclination (wherein the third angle of inclination is different from the second angle of inclination), which causes foodstuff to dispense from the transfer receptacle 107 at a third flow rate into the container 108 on the weighing device 109. The third flow rate is less than the second flow rate so that high accuracy can be achieved. Typically, the third amplitude of vibration is less than the second amplitude of vibration, the third frequency of vibration is less than the second frequency of vibration, and/or the third angle of inclination α is less than the second angle of inclination α. Typically the third flow rate is approximately 5 to 10% of the first flow rate.

Using the first and second, and optionally the third, flow rates enables the final measured weight to quickly achieve the target weight, with an acceptable degree of accuracy.

The vibration frequency may be held substantially constant during the first, second and third operational conditions, since the inventors have determined that changing the amplitude of vibration has a more significant effect on the resultant flow rate.

When the measured weight reaches the target weight, the control system 113 switches off the vibrator unit 111 and changes the orientation of the transfer receptacle to an inclination angle α that is sufficiently low that no further material is dispensed from the receptacle 107.

According to the programmed dispensing requirements, the transfer receptacle 107 can be returned to the storage unit, moved to a cleaning unit, or moved back (FIG. 16: F) to one of the filling stations 103 to receive additional material (FIG. 16: G), which can be the same or different from the material just dispensed. If additional material is required, the process is repeated as frequently as necessary.

The container 108 storing the measured ingredients can be moved to a downstream processing unit, such as a processing unit in a food production system.

The operational conditions of the vibrator unit 111 and the angle of inclination α are at least in part determined by the foodstuff being dispensed, and the operational conditions, for example the local temperature and humidity. Since the control system receives feedback on the dispensing rate from the weighing device 109 it is able to dynamically adjust at least one of the amplitude of vibration, the frequency of vibration and the angle of inclination in order to ensure that target weight is reached within a predetermined period of time.

Although the present invention has been described in connection with specific preferred embodiments, it should be understood that the invention as claimed should not be unduly limited to such specific embodiments. Furthermore, it will be apparent to the skilled person that modifications can be made to the above embodiment that fall within the scope of the invention, for example if more than one scoop of material is required to reach the target weight, the control system may pour foodstuff from the receptacle into the container/package through the open top in the conventional manner, that is, without using the vibrator unit. The control system can be programmed so that only the final scoop of material is dispensed through the perforations. This helps to reach the target weight more quickly. Of course, there may be some benefit in terms of the quality of the product by dispensing all scoops of foodstuff through the perforations, and the control system can be programmed to dispense all scoops of foodstuff through the perforations.

The control system 13 can control the vibrator unit 11 to adjust the vibration frequency during a dispensing operation. For example, in a first operational condition the vibrator unit can vibrate at a first frequency. In second operational condition the vibrator unit can operate at a second operational frequency. In a third operational condition the vibrator unit can operate at a third operational frequency. Preferably the second frequency is lower than the first frequency. Preferably the third frequency is lower than the second frequency.

When the measured weight reaches a first predetermined fraction of the target weight, for example 90% of the target weight, the control system can switch from the first operational condition to the second operational condition. When the measured weight reaches a second predetermined fraction of the target weight, for example 98% of the target weight, the control system can switch from the second operational condition to the third operational condition. The vibration amplitude can be held substantially constant during the first, second and third operational conditions. Alternatively, the vibration amplitude may also be varied.

Figure 6:
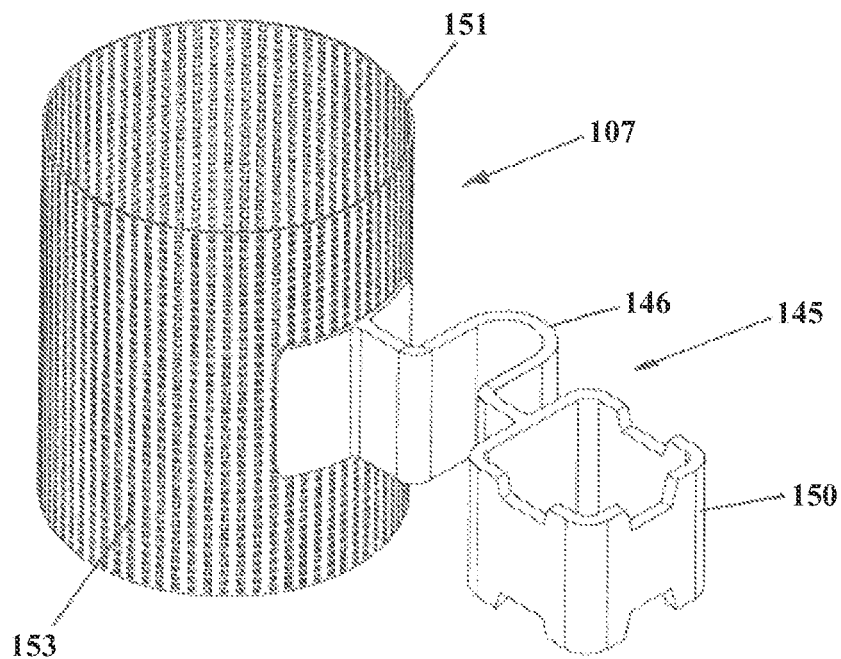
FIG. 6 is a first alternative receptacle.
Figure 7:
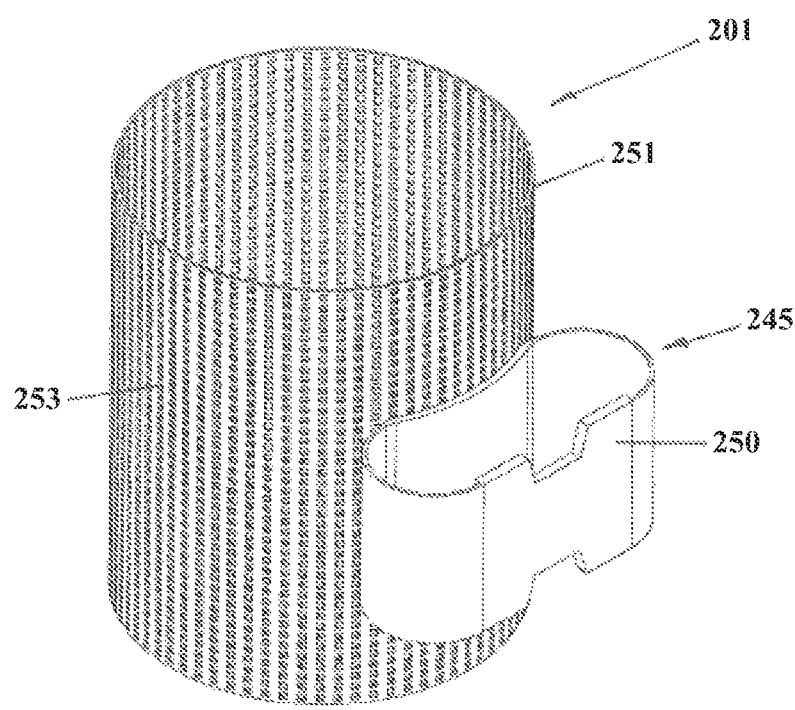
FIG. 7 is a second alternative receptacle.

Alternative transfer receptacles 107,207 are shown in FIGS. 6 and 7. In the arrangement shown in FIG. 6, the base is solid and substantially the entire side wall 107b comprises a perforated 153 structure. The bracket 145 is similar to the bracket 45. In the embodiment of FIG. 7, the base has a perforated structure and substantially the entire side wall 251 has a perforated 253 structure. The embodiment of FIG. 7 has a different shaped lifting bracket 245, for use with a different end effector (not shown). The bracket 245 includes a single looped formation 250. The weighing system can include any suitable type of transfer receptacle 7,107,207, and can include more than one type of receptacle 7,107,207. The appropriate receptacle 7,107,207 is selected for the appropriate foodstuff and environmental conditions. Surprisingly, the inventors have determined that very little foodstuff escapes the receptacle 7,107,207 when moving between the trough 21 and weighing device 9, even when the base of the receptacle includes perforations 53.

The control system 13 can use any suitable number of different operational conditions for the vibrator unit.

The weighing system 1 may include at least one additional robotic arm 5, and the control system 13 is arranged to control operation of each of the robotic arms 5.

The number of weighing devices in the weighing system cell can be different. Typically there are between 1 and 5 weighing devices in a weighing system cell.

The number of storage units in the weighing system cell can be different. Typically there are between 1 and 10 storage units in a weighing system cell.

The number of transfer receptacles in the weighing system cell can be different. Typically there are between 1 and 20 transfer receptacles in a weighing system cell.

The number of vibrator units in the weighing system cell can be different. Typically there are between 1 and 5 vibrator units in a weighing system cell.

The control system 13 can control the vibrator unit 11 to use a single vibration amplitude throughout a dispensing operation.

The robotic arm 5 may be moveably mounted to enable translational movement within the weighing cell, for example the robotic arm can be mounted on rails instead of a fixed base.

The vibration frequency can have a different value from the embodiments described above. For example, the frequency can be in the range 1 Hz to 300 Hz.

While the embodiments described relate to food ingredients it is envisaged that apparatus can be adapted for use in non-food industries where one or more particulate ingredients has to be processed.

The invention claimed is:

1. A weighing system for weighing particulate materials said weighing system including:
   a weighing device;
   a vibrator unit;
   a transfer receptacle having an opening, wherein the transfer receptacle is arranged to receive a quantity of the particulate material through the opening;
   a robotic arm arranged to move the transfer receptacle; and
   a control system arranged to control the robotic arm and the vibrator unit;
   wherein the control system is arranged to:
   actuate the robotic arm to move the transfer receptacle adjacent the weighing device, device;
   adjust an angle of inclination of the transfer receptacle to a dispensing angle of inclination to commence dispensing of the particulate material from the transfer receptacle;
   actuate the vibrator unit to vibrate the transfer receptacle thereby causing particulate material located in the transfer receptacle to dispense from the transfer receptacle onto the weighing device;
   monitor an output signal from the weighing device during a weighing operation, which is indicative of a measured weight of particulate material dispensed onto the weighing device, in order to achieve a target weight of dispensed particulate material; and
   adjust the angle of inclination of the transfer receptacle during a weighing operation in order to control the rate at which particulate material is dispensed from the transfer receptacle.

2. The system according to claim 1, wherein the control system is arranged to adjust at least one of: the vibrator unit vibration frequency and the vibrator unit vibration amplitude during a weighing operation in order to control the rate at which particulate material is dispensed from the transfer receptacle.

3. The system according to claim 2, wherein the control system is arranged to determine a condition wherein the measured weight is equal to a first predetermined fraction of the target weight, and in response to detecting the condition wherein the measured weight is equal to the first predetermined fraction of the target weight, the control system is arranged to switch the vibrator unit from a first operational condition which causes particulate material to dispense from the transfer receptacle at a first flow rate to a second operational condition which causes particulate material to dispense from the transfer receptacle at a second flow rate.

4. The system according to claim 3, wherein the first operational condition has a first amplitude of vibration, the second operational condition has a second amplitude of vibration, wherein the second amplitude of vibration is lower than the first amplitude of vibration and the second flow rate is lower than the first flow rate; and/or the first operational condition has a first frequency of vibration, the second operational condition has a second frequency of vibration, wherein the second frequency of vibration is lower than the first frequency of vibration and the second flow rate is lower than the first flow rate.

5. The system according to claim 1, wherein the control system is arranged to determine a condition wherein the measured weight is equal to a first predetermined fraction of the target weight, and in response to detecting the condition wherein the measured weight is equal to the first predetermined fraction of the target weight, the control system is arranged to adjust the angle of inclination of the transfer receptacle from a first inclination angle which causes particulate material to dispense from the receptacle at a first flow rate to a second inclination angle which causes particulate material to dispense from the transfer receptacle at a second flow rate.

6. The system according to claim 1, wherein the control system is arranged to cease vibrating the transfer receptacle when the control system determines from the output signal that the measured weight is equal to the target weight.

7. The system according to claim 1, wherein the vibrator unit has a vibration frequency in the range 1 Hz to 300 Hz; and/or the vibrator unit has a vibration amplitude in the range 0.1 mm to 10 mm.

8. The system according to claim 1, the vibrator unit is arranged to cause particulate material to be dispensed from the transfer receptacle via the opening, and the opening comprises an open-topped portion of the transfer receptacle.

9. The system according to claim 1, wherein the robotic arm includes an end effector that is arranged to engage the transfer receptacle.

10. The system according to claim 9, wherein the end effector is arranged to engage at least one of a side wall of the transfer receptacle and a rim of the transfer receptacle.

11. The system according to claim 10, wherein the end effector includes an engagement plate that is arranged to engage at least one of the side wall of the transfer receptacle and the rim of the transfer receptacle.

12. The system according to claim 9, wherein the end effector includes a locking system that is arranged to clamp the transfer receptacle to the end effector.

13. The system according to claim 12, wherein the locking system is arranged to clamp a rim of the transfer receptacle to the end effector.

14. The system according to claim 13, wherein the locking system includes at least one linear actuator.

15. The system according to claim 1, wherein the vibrator unit is mounted on the robotic arm.

16. The system according to claim 9, including damping material located between the vibrator unit and the end effector.

17. The system according to claim 9, wherein the end effector includes a vacuum system for applying a negative pressure adjacent a wall of the transfer receptacle.

18. The system according to claim 17, wherein the vacuum system includes at least one suction cup that is arranged to engage the wall of the transfer receptacle.

19. The system according to claim 1, wherein the transfer receptacle includes perforations, and the vibrator unit is arranged to cause particulate material to be dispensed from the transfer receptacle via the perforations.

20. The system according to claim 1, wherein the vibrator unit is located adjacent the weighing device.

21. The system according to claim 1, wherein the robotic arm includes an end effector that is arranged to engage the transfer receptacle, and the vibrator unit is mounted on the end effector.

22. The system according to claim 17, wherein the wall is a side wall.

23. The system according to claim 18, wherein the wall is a side wall.

24. The system according to claim 1, wherein the control system is arranged to change the angle of inclination of the transfer receptacle to a non-dispensing angle of inclination when the control system determines from the output signal that the measured weight is equal to the target weight.

25. A method for weighing particulate materials, said method including:
providing a weighing system having a weighing device, a transfer receptacle having an opening, a robotic arm arranged to move the transfer receptacle, a vibrator unit, and a control system arranged to control the robotic arm and the vibrator unit;
inserting a quantity of particulate material into the transfer receptacle;
moving the transfer receptacle adjacent the weighing device;
the control system adjusting an angle of inclination of the transfer receptacle to a dispensing angle of inclination to commence dispensing of the particulate material from the transfer receptacle;
the control system actuating the vibrator unit to vibrate the transfer receptacle thereby dispensing the particulate material from the transfer receptacle into a container located on the weighing device;
the control system monitoring an output signal from the weighing device during a weighing operation, which is indicative of a measured weight of particulate material dispensed onto the weighing device, in order to achieve a target weight of dispensed particulate material; and
the control system, in response to signals received from the weighing device, adjusting an angle of inclination of the transfer receptacle in order to adjust the flow rate of material dispensed from the transfer receptacle.

26. The method according to claim 25, including the control system, in response to signals received from the weighing device, adjusting at least one of vibration amplitude of the vibrator unit and vibration frequency of the vibrator unit in order to adjust the flow rate of material dispensed from the transfer receptacle.

27. The method according to claim 25, including the control changing the angle of inclination of the transfer receptacle to a non-dispensing angle of inclination when the control system determines from the output signal that the measured weight is equal to the target weight.

28. The method according to claim 25, wherein the particulate materials comprise at least one of powders and granules.

29. The method according to claim 25, wherein the particulate materials comprise at least one foodstuff.

30. The method according to claim 25, including the control system determining a condition wherein the measured weight is equal to a first predetermined fraction of the target weight, and in response to detecting the condition wherein the measured weight is equal to the first predetermined fraction of the target weight, the control system adjusting the angle of inclination of the transfer receptacle from a first inclination angle which causes particulate material to dispense from the receptacle at a first flow rate to a second inclination angle which causes particulate material to dispense from the transfer receptacle at a second flow rate.

31. A weighing system for weighing particulate materials, said weighing system including:
a weighing device;
a vibrator unit;
a transfer receptacle having an opening, wherein the transfer receptacle is arranged to receive a quantity of the particulate material through the opening;
a robotic arm arranged to move the transfer receptacle; and
a control system arranged to control the robotic arm and the vibrator unit;
wherein the control system is arranged to:
actuate the robotic arm to move the transfer receptacle adjacent the weighing device;
adjust an angle of inclination of the transfer receptacle to a dispensing angle of inclination to commence dispensing of the particulate material from the transfer receptacle;

actuate the vibrator unit to vibrate the transfer receptacle thereby causing particulate material located in the transfer receptacle to dispense from the transfer receptacle onto the weighing device;

monitor an output signal from the weighing device during a weighing operation, which is indicative of a measured weight of particulate material dispensed onto the weighing device, in order to achieve a target weight of dispensed particulate material; and determine a condition wherein the measured weight is equal to a first predetermined fraction of the target weight, and in response to detecting the condition wherein the measured weight is equal to the first predetermined fraction of the target weight, the control system is arranged to adjust the angle of inclination of the transfer receptacle from a first inclination angle which causes particulate material to dispense from the receptacle at a first flow rate to a second inclination angle which causes particulate material to dispense from the transfer receptacle at a second flow rate.

* * * * *